(12) United States Patent
Farr et al.

(10) Patent No.: US 7,953,326 B2
(45) Date of Patent: May 31, 2011

(54) SYSTEMS AND METHODS FOR UNDERWATER OPTICAL COMMUNICATION

(75) Inventors: Norman E. Farr, Woods Hole, MA (US); Lee Freitag, Falmouth, MA (US); James Preisig, Falmouth, MA (US); Dana R. Yoerger, North Falmouth, MA (US); Sheri N. White, East Falmouth, MA (US); Alan D. Chave, Falmouth, MA (US)

(73) Assignee: Woods Hole Oceanographic Institution, Woods Hole, MA (US)

( * ) Notice: Subject to any disclaimer, the term of this patent is extended or adjusted under 35 U.S.C. 154(b) by 658 days.

(21) Appl. No.: 11/348,726

(22) Filed: Feb. 6, 2006

(65) Prior Publication Data

US 2007/0183782 A1    Aug. 9, 2007

(51) Int. Cl.
*H04B 13/02* (2006.01)
*H04B 10/00* (2006.01)

(52) U.S. Cl. ......... 398/104; 398/118; 398/128; 398/130

(58) Field of Classification Search .................. 398/104, 398/118, 128, 130
See application file for complete search history.

(56) References Cited

U.S. PATENT DOCUMENTS

| | | | |
|---|---|---|---|
| 4,021,661 A | 5/1977 | Levine | |
| 4,050,819 A | 9/1977 | Lichtman | |
| 4,475,816 A | 10/1984 | Mooradian et al. | |
| 4,502,407 A | 3/1985 | Stevens | |
| 4,525,873 A | 6/1985 | Baues et al. | |
| 4,599,745 A | 7/1986 | Baran et al. | |
| 4,779,959 A * | 10/1988 | Saunders | 349/198 |
| 4,823,402 A | 4/1989 | Brooks | |
| 4,829,597 A * | 5/1989 | Gelbwachs | 398/104 |
| 4,977,546 A | 12/1990 | Flatley et al. | |
| 5,054,881 A | 10/1991 | Fisher et al. | |
| 5,184,230 A | 2/1993 | Watson | |
| 5,267,070 A | 11/1993 | Stewart et al. | |
| 5,269,777 A * | 12/1993 | Doiron et al. | 606/7 |
| 5,305,135 A | 4/1994 | Chovan | |
| 5,334,972 A | 8/1994 | Sugimoto et al. | |
| 5,345,327 A * | 9/1994 | Savicki | 398/212 |
| 5,347,387 A | 9/1994 | Rice | |

(Continued)

FOREIGN PATENT DOCUMENTS

CA    2455284 A1    7/2005

(Continued)

OTHER PUBLICATIONS

"Free-space optics (FSO) submerged", Aug. 17, 2003, OpticsReport, http://www.opticsreport.com/content/article.php?article_id=1015.*

(Continued)

*Primary Examiner* — Ken N Vanderpuye
*Assistant Examiner* — Daniel G Dobson
(74) *Attorney, Agent, or Firm* — Ropes & Gray LLP

(57) ABSTRACT

The systems and methods of the invention provide for improved underwater communication systems. In particular, the systems and methods of the invention provide for improved underwater optical modems including optical transmitters and optical receivers that allow omni-directional transmission and reception of optical signals underwater and having a range of about 100 m and allowing data rates greater than 1 Mbit/s. The systems and methods of the invention also provide for underwater communication networks having a plurality of optical modems communicating with each other.

30 Claims, 10 Drawing Sheets

U.S. PATENT DOCUMENTS

| | | | |
|---|---|---|---|
| 5,365,603 | A | 11/1994 | Karmann |
| 5,373,487 | A | 12/1994 | Crawford et al. |
| 5,377,165 | A | 12/1994 | LaPointe et al. |
| 5,570,222 | A | 10/1996 | Chovan |
| 5,604,582 | A | 2/1997 | Rhoads et al. |
| 5,676,820 | A | 10/1997 | Wang et al. |
| 5,894,450 | A | 4/1999 | Schmidt et al. |
| 5,942,103 | A | 8/1999 | Wang et al. |
| 6,366,533 | B1 | 4/2002 | English |
| 6,459,818 | B1 | 10/2002 | George |
| 6,464,405 | B2 | 10/2002 | Cairns et al. |
| 6,552,964 | B2 | 4/2003 | Chiang et al. |
| 6,570,176 | B1 | 5/2003 | Fucile |
| 6,811,327 | B1 | 11/2004 | Billet |
| 6,813,218 | B1 | 11/2004 | Antonelli et al. |
| 6,842,401 | B2 | 1/2005 | Chiang et al. |
| 2002/0176323 | A1 | 11/2002 | Magine et al. |
| 2003/0117623 | A1 | 6/2003 | Tokhtuev et al. |
| 2004/0076415 | A1 | 4/2004 | Da Silva |
| 2005/0232638 | A1* | 10/2005 | Fucile et al. ............ 398/140 |
| 2006/0008275 | A1* | 1/2006 | Lacovara et al. ......... 398/140 |
| 2008/0205892 | A1 | 8/2008 | Baiden |

FOREIGN PATENT DOCUMENTS

| | | |
|---|---|---|
| JP | 04103232 A | 6/1992 |
| JP | 2001055194 A | 2/2001 |
| WO | WO-00/20796 | 4/2000 |

OTHER PUBLICATIONS

Kahn, Joseph M. et al., "Non-Directed Infrared Links for High-Capacity Wireless LANs", 2nd Quarter 1994, IEEE Personal Communications, pp. 12-25.*

Farr N. et al., "Optical Modem Technology for Seafloor Observatories," Oceans, 2005. Proceedings of MTS/IEEE Washington, DC, usa Sep. 18-23, 2005, Piscataway, NJ-USA IEEE, II Sep. 18, 2005, pp. 1-7.*

Farr N. et al., "Optical Modem Technology for Seafloor Observatories," Oceans, 2005. Proceedings of MTS/IEEE Washington, DC, usa Sep. 18-23, 2005, Piscataway, NJ-USA IEEE, Sep. 18, 2005, pp. 1-7.

"Free-Space Laser Communications: a Historical Perspective" by David L. Begley, Director of Special Initiatives—Ball Aerospace & Technologies Corp. (IEEE 2002).

"Free-Space Laser Communications: The Agony and the Ecstasy" by David L. Begley, Director of Strategic Innovation—Ball Aerospace & Technologies Corp. (IEEE 1999).

Bales, J.W., et al., "High-Bandwidth, Low-Power, Short-Range Optical Communication Underwater," Proceedings of the 9th International Symposium of Unmanned Submersible-Technology, pp. 406-415 (1995).

Weid, J.P. et al., "Underwater Cableless Data Transmission," Oceans '93, Engineering in Harmony with Ocean, pp. 191-193.

"Dr. Phil Lacovara discuses undersea FSO with OpticsReport," www.opticsreport.com/content/interview.php?interview_id=3021, dated Aug. 28, 2003, 3 pages.

* cited by examiner

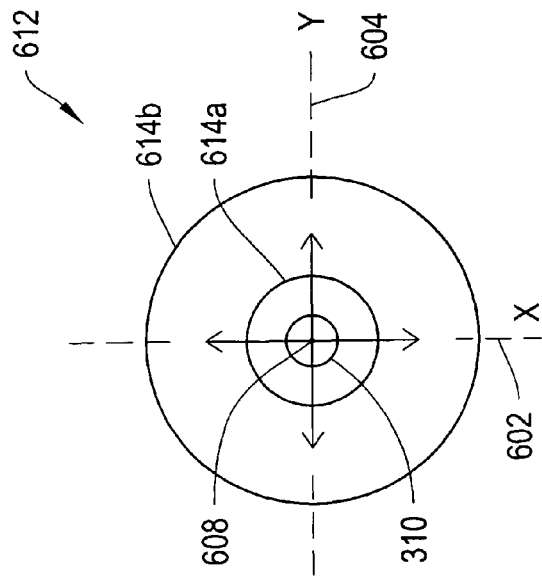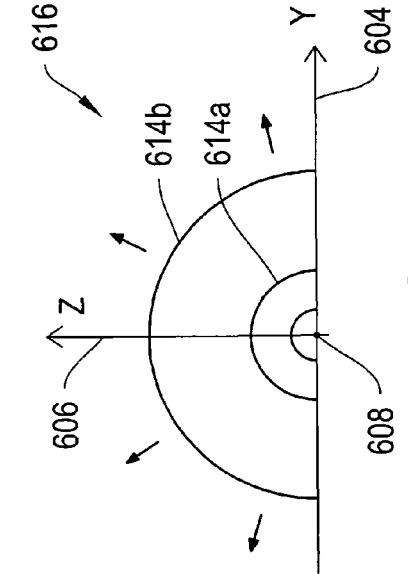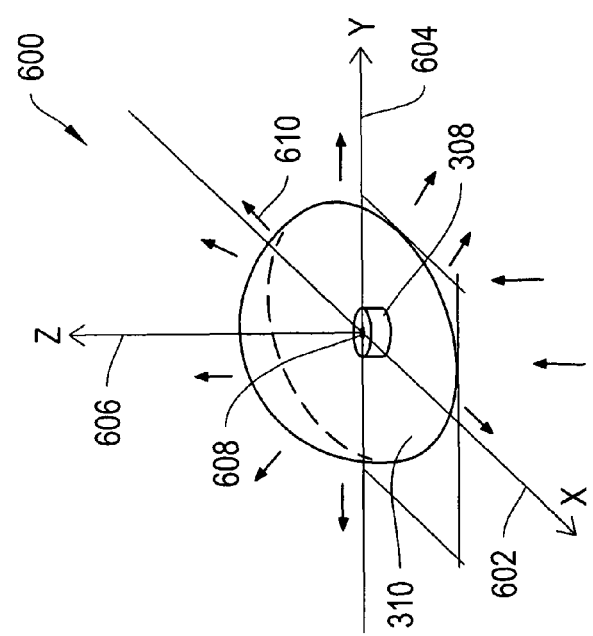

SYSTEMS AND METHODS FOR UNDERWATER OPTICAL COMMUNICATION

BACKGROUND OF THE INVENTION

There is an increasing need for long term observation of the earth-ocean system. In particular, scientists wish to monitor oceanic processes as well as improve predictive modeling of complex natural phenomena that vary over distance and time. Ocean observatories are being deployed at the seafloor and connected by cable or buoy to surface networks to help scientists study these oceanic processes. Scientists are also deploying unmanned underwater vehicles (UUV) that, due to their mobility, can expand the reach of the seafloor observatories. These UUVs typically carry sensors on-board and operate autonomously, carrying out pre-programmed missions. Certain types of UUVs are tethered by cable to the seafloor observatories. The tethered UUVs have a short range of motion and are limited by the length of the tether. Scientists are also deploying un-tethered UUVs which are controlled wirelessly by an acoustic communication system or an optical communication system. Acoustic communication systems, however, are limited by low bandwidth and high latency, and do not permit video or other high-rate data transfers.

Accordingly, there is a need for an improved underwater communication system that allows high-bandwidth, bidirectional wireless communication between UUV and seafloor observatories or other seafloor nodes. In general, there is a need for a high-bandwidth, high-range underwater communication system that allows bidirectional wireless communication.

SUMMARY OF THE INVENTION

The systems and methods described herein include improved underwater communication systems and improved methods to communicate between two or more underwater nodes, including unmanned underwater vehicles and seafloor observatories.

In one aspect, the invention provides an underwater communication system that includes a transmitter and receiver that are physically separated from each other and can send and receive electromagnetic radiation in the optical spectrum. The transmitter includes a diffuser to diffuse the optical radiation along many different directions to allow omni-directional transmission. The receiver includes a diffuser to diffuse optical radiation from a plurality of different directions to allow omni-directional reception. In other aspects, the invention provides for an underwater communication system that includes multiple nodes, having transmitters and receivers that are configured for high-bandwidth, high-range and omni-directional communication between the nodes.

More particularly, in one aspect, the systems and methods described herein include underwater communication systems. The underwater communication systems comprise a transmitter having a source capable of emitting electromagnetic radiation, and a diffuser capable of diffusing the electromagnetic radiation. The diffuser is disposed in a position surrounding a portion of the source for diffusing the electromagnetic radiation in a plurality of directions. The underwater communication system may also comprise a receiver having a detector capable of detecting electromagnetic radiation, such that the electromagnetic radiation can be received in substantially any direction. The transmitter and the receiver may be physically separated from each other and the electromagnetic radiation may include electromagnetic waves of wavelength in the optical spectrum between 300 nm and 800 nm.

In one embodiment, the transmitter may include a plurality of sources and optionally, the sources may be individually controllable. The transmitter may also include an electronic circuit to drive the source. The electronic circuit may include at least one of an emitter coupled logic design, a cascode configured design, and a totem pole-type design. The electronic circuit may include at least one of a field effect transistor, and a bipolar device. Additionally and optionally, the transmitter may comprise an etalon to modulate the electromagnetic radiation from the source.

In another embodiment, the receiver may comprise a diffuser capable of diffusing the electromagnetic radiation and disposed in a position surrounding a portion of the detector. The receiver may be capable of receiving the electromagnetic radiation along a radius of a hemispherical region. In certain embodiments, the receiver may include an electronic circuit to prevent the saturation of the detector. In such embodiments, the electronic circuit may include an automatic gain control circuit.

The diffuser may be formed from at least one of a discrete reflective element, a discrete refractive element and a high transmission scattering medium. The diffuser may be integrally formed with the detector. Additionally and optionally, the diffuser may be integrally formed with the source. The diffuser may also be disposed on top of the source. In another embodiment, the diffuser may be capable of diffusing the electromagnetic radiation in a plurality of directions along a radius of a hemispherical region. The diffuser may be formed from at least one of silicone and $TiO_2$. In certain embodiments, the source may include at least one of a light emitting diode, a laser diode and a photodiode and it may be embedded in the diffuser. The detector may be a photomultiplier tube including a large-aperture, hemispherical photomultiplier tube.

In another aspect, the systems and methods described herein include underwater communication systems comprising two or more nodes that can transmit and receive electromagnetic radiation. Each node may include a transmitter having a source capable of emitting electromagnetic radiation, and a diffuser capable of diffusing the electromagnetic radiation. The diffuser may be disposed in a position surrounding a portion of the source for diffusing the electromagnetic radiation in a plurality of directions. Each node may also include a receiver having a detector capable of detecting electromagnetic radiation, such that the electromagnetic radiation can be received in substantially any direction. In such a system, two or more nodes are physically separated from each other and the electromagnetic radiation includes electromagnetic waves of wavelength in the optical spectrum between 300 nm and 800 nm.

In one embodiment, the power of transmission of the electromagnetic radiation is kept fairly constant over time. Each of the two or more nodes may transmit and receive the electromagnetic radiation at a rate of approximately 1 Mbps or higher. The two or more nodes may be separated from each other by a distance of approximately 100 m or higher. Additionally and optionally, at least one of the two or more nodes includes a mobile unit. One of the two or more nodes may also include a stationary unit.

In another aspect, the systems and methods described herein include methods of manufacturing an optical modem for an underwater optical communication system. The methods may include the steps of providing at least one source of optical radiation and disposing the at least one source within a diffuser such that the electromagnetic radiation emitted from the source is diffused in a plurality of different directions. The method may also include providing at least one detector configured to receive and detect optical radiation from a plurality of different directions. A portion of the source, the diffuser and the detector may be enclosed in a water impermeable enclosure such that the optical modem may transmit and receive optical radiation underwater.

BRIEF DESCRIPTION OF THE DRAWINGS

The following figures depict certain illustrative embodiments of the invention in which like reference numerals refer to like elements. These depicted embodiments may not be drawn to scale and are to be understood as illustrative of the invention and not as limiting in any way.

FIG. 6A-6C are charts depicting the direction of propagation of electromagnetic radiation from a transmitter according to the invention.

DETAILED DESCRIPTION OF CERTAIN ILLUSTRATED EMBODIMENTS

These and other aspects and embodiments of the systems and methods of the invention will be described more fully by referring to the figures provided.

The systems and methods described herein will now be described with reference to certain illustrative embodiments. However, the invention is not to be limited to these illustrated embodiments which are provided merely for the purpose of describing the systems and methods of the invention and are not to be understood as limiting in anyway.

As will be seen from the following description, in one aspect the invention provides an underwater communication system that includes a transmitter and receiver that are physically separated from each other and can send and receive electromagnetic radiation in the optical spectrum. The underwater communication systems include diffusers that diffuse the optical radiation such that the transmitter may send optical radiation in many different directions and the receiver may detect optical radiation arriving from many different directions. In other aspects, the systems provide for an underwater communication system that includes two or more modems, each modem having transmitters and receivers that are configured to send and receive optical radiation to and from many different directions.

Figure 1:
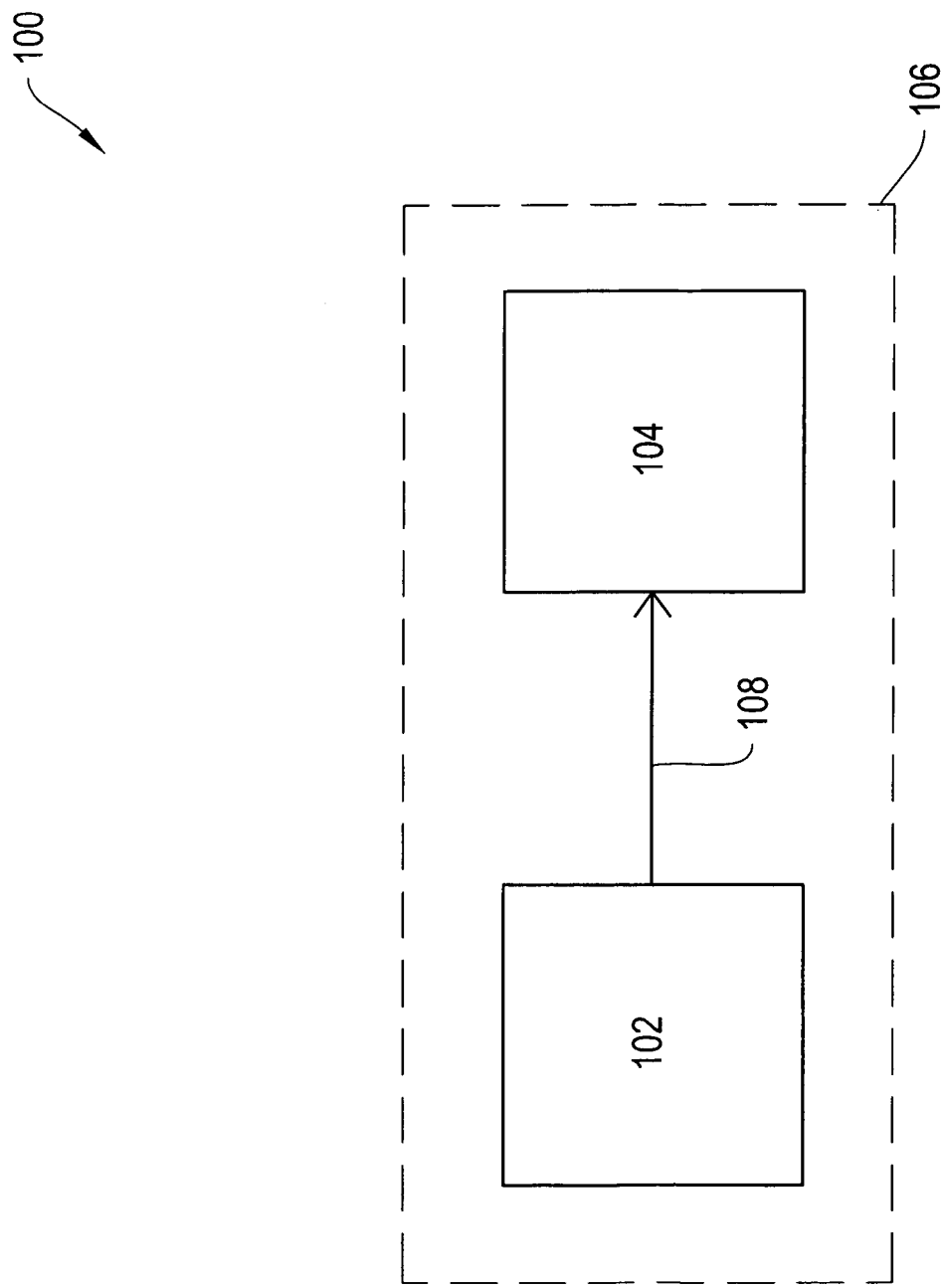
FIG. 1 depicts a high-level block diagram of an optical communication system according to the invention.

FIG. 1 depicts a high-level block diagram of an optical communication system 100 comprising a transmitter 102 and a receiver 104. The transmitter 102 and the receiver 104 are shown to be physically separated from each other in a communication medium 106. Arrow 108 indicates the direction of information flow from the transmitter 102 to the receiver 104.

Transmitter 102 includes electronic and optical components to prepare and then wirelessly transmit an input signal across the communication medium 106. To prepare an input signal for the purposes of transmission, the transmitter 102 receives input signals from an input device and then converts the format of the input signal to a format that can be used to transmit the information contained in the input signal through the communication medium 106. In one embodiment, the transmitter 102 may be configured to receive input signals from different types of input devices. In such an embodiment, the input devices may include data elements such as sensors including a temperature sensor, a pressure sensor, a motion sensor, a light sensor, and/or a video camera. The input devices may also include control elements such as a keyboard, a mouse, a joystick, a keypad and a program on a computer. The transmitter 102 may be configured to convert the format of the input signals obtained from both data elements as well as control elements to a format that is better suited for transmitting the information contained in the input signal over particular communication medium 106. As an example, if the communication medium 106 is water, then the format of the input signal may be converted to a format that the transmitter may be able to send on electromagnetic waves in the optical spectrum.

To wirelessly transmit a prepared input signal through the communication medium 106, the transmitter 102 includes an oscillator to generate a carrier wave and a directional element to control the direction in which the information is transmitted. The oscillator in a transmitter may be configured with suitable circuitry to generate a carrier wave of a suitable type, intensity and frequency. The carrier wave typically carries the information in the input signal. In one embodiment, the transmitter may be configured to include an oscillator that is capable of generating electromagnetic waves (carrier waves) in the optical frequency range where the intensity of the electromagnetic waves are modulated according to the information contained in the prepared input signal. The directional element in a transmitter 102 may be configured to control the direction in which the modulated carrier waves are transmitted. Directional elements may include a diffuser to transmit the modulated carrier waves in a number of directions. The directional element may include collimators that transmit the modulated carrier waves (typically in the optical spectrum) in a particular desired direction based, at least in part, on the arrangement of the elements in the collimator. The modulated carrier wave is transmitted through the communication medium 106 and may be received and detected by a suitable receiver 104.

Receiver 104 includes electronic and electrical components to receive and process a modulated carrier wave containing information from the input signal from a transmitter 102 across a communication medium 106. To receive a modulated carrier wave, the receiver 104 includes a directional element to control the direction from which the information is received and a detector to detect a characteristic of the modulated carrier wave. Directional elements may include a diffuser to receive the modulated carrier waves from a plurality of directions. The directional element may also include tracking elements such as acoustic sensors such that the modulated carrier wave is received from a particular direction. The detector in a receiver 104 may be configured with suitable circuitry to detect incoming modulated carrier waves and generate electrical signals corresponding to the type, intensity and frequency of the modulated carrier wave. In one embodiment, the receiver 104 may be configured to include a detector that is capable of detecting electromagnetic waves (carrier waves) in the optical frequency range where the intensity of the electromagnetic waves are modulated by a transmitter 102 according to the information contained in the signal being transmitted and received. In one implementation, receiver 104 includes a detector such as a photomultiplier tube.

To process a received modulated carrier wave, the receiver 104 includes circuitry to convert the format of the modulated carrier wave to a format that can be used to further analyze the information contained in the modulated carrier wave and then to output the processed signal to a desired output device. In one embodiment, the receiver 104 may be configured to convert the format of the modulated carrier wave to a format such that the underlying carrier wave may be removed leaving behind the information contained in the original input signal sent from the transmitter 102. The receiver 104 may also include circuitry to further format the information such that the processed signal may have a format that is acceptable to output devices. In one embodiment, the receiver 104 may be configured to output the processed signal to different types of output devices. In such embodiments, the output devices may include computers, sensors and power supply units. The flow of information over the communication medium 108 is typically from the transmitter 102 to the receiver 104.

Arrow 108 shows that this flow of information from the transmitter to the receiver. While arrow 108 depicts the direction of information flow, it does not necessarily restrict the direction of propagation of the modulated carrier wave to any special direction. The direction of propagation of the modulated carrier wave may typically be controlled by the directional elements in the transmitter 102 and the receiver 104. Even though, arrow 108 shows the flow of information from one transmitter to one receiver, it does not necessarily restrict information flow to only between one transmitter and one receiver.

In other embodiments, the receiver 104 may receive transmitted signals from one or more transmitters 102. The transmitter 102 may also transmit to one or more receivers 104. A more detailed discussion about the components and operation of the transmitter 102 and the receiver 104 is presented in FIGS. 3 and 4.

The communication medium 106 is the physical medium located between the transmitter and the receiver through which the modulated carrier waves propagate. In one embodiment the communication medium is water. In such an embodiment, the communication medium may be more specifically one of salt water, sea water, mineral water, lake water, or clear water. In alternative embodiments, the communication medium may be any liquid. In other embodiments, the communication medium may be any gas. The communication medium 106 actually present may limit the selection of carrier waves. While carrier waves with a certain range of frequencies may be used in certain types of wireless communication in air and space, those carrier waves may not be used for wireless communication underwater. As an example, if the communication medium 106 is water, then the carrier waves may be selected to be electromagnetic in nature and may have a wavelength selected from a wavelength in the optical spectrum. The choice of carrier wave in a certain medium 106 is influenced by attenuating characteristics of the medium 106. For example, the decrease in intensity of electromagnetic radiation as it passes through a communication medium 106 is typically exponentially related to at least the attenuation coefficient and the range ($e^{-cR}$ where "c" is the attenuation coefficient and the "R" is the range). The attenuation coefficient and the range are typically functions of wavelength of the electromagnetic radiation.

Figure 2:
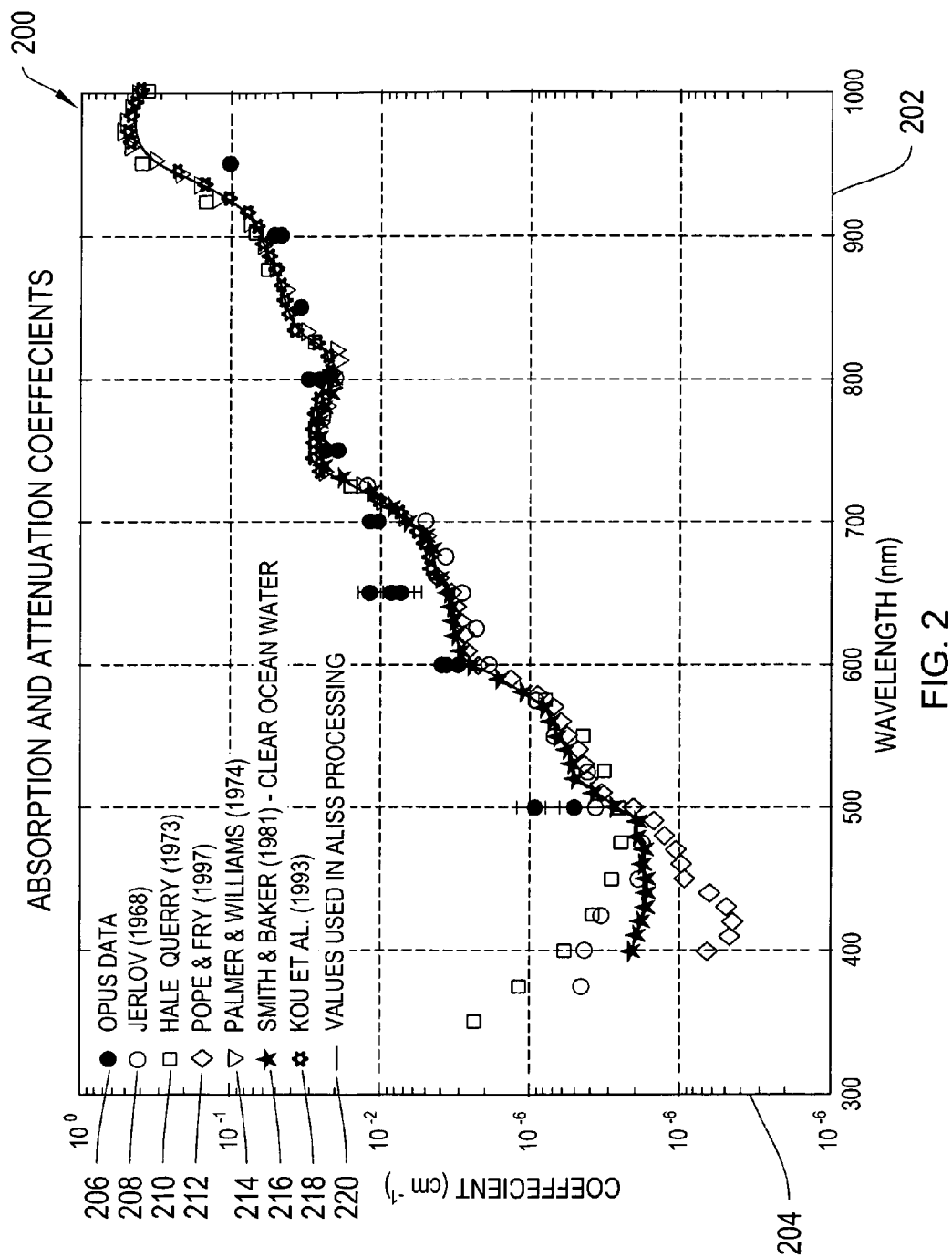
FIG. 2 is a graph depicting the relationship between attenuation coefficient of electromagnetic radiation and wavelength of the electromagnetic radiation in water and seawater.

FIG. 2 is a graph depicting the relationship between the coefficient of attenuation of electromagnetic radiation in water and the wavelength of the electromagnetic radiation. The horizontal axis 202 represents the wavelength of the electromagnetic radiation in nm ($10^{-9}$ m). The vertical axis represents the attenuation coefficient in $cm^{-1}$ shown in a logarithmic scale. The data points for plots 206-220 show experimental results for attenuation coefficients at certain wavelengths.

More, particularly, graph 200 shows the attenuation coefficient of electromagnetic radiation in clear water as well as sea water. Since data points corresponding to water and sea water plots 206-220 in graph 200 can be approximated by a straight line and since the vertical axis is in logarithmic scale, we can say that the relationship between the attenuation coefficient of electromagnetic radiation and wavelength is roughly exponential. The graph 200 further shows that seawater is generally opaque to electromagnetic radiation except over the optical spectrum.

The attenuation coefficient depicted in graph 200 typically includes both absorption and scattering components. The absorption and scattering have a strong wavelength dependence that is typically determined by at least the type and number of particles found in the volume of seawater. However, water clarity is generally known to be high at deeper locations than in shallow or surface locations and consequently the scattering component is small in comparison with the absorption component of attenuation.

In addition to absorption and scattering, other factors may also influence the optical properties of water. In oceanic conditions, some other factors include Cerenkov radiation and bioluminescence. Cerenkov radiation is the light emitted when charged particles enter a transparent medium at a speed greater than the speed of light in that medium. It is typically seen as a bluish glow around strong radioactive sources, such as irradiated fuel elements stored under water. Cerenkov radiation in seawater includes a spatially distributed source of light throughout the ocean caused by the radioactive decay of $K^{40}$. Bioluminescence is light generated by living organisms. Bioluminescence can produce irregular flashes of blue-green light that are typically an order of magnitude more intense than the Cerenkov radiation.

As noted above, the range of propagation of electromagnetic radiation in the optical spectrum ("light") is also typically a function of wavelength. In an underwater wireless optical communication system, similar to system 100, the range of the optical link between the transmitter 102 and the receiver 104 may also be proportional to the optical power of signals sent by the transmitter 102, an illuminated area that may be controlled by the directional element in the transmitter 102, light gathering aperture of the directional element at the receiver 104, bit rate controlled by the modulation scheme used in the transmitter 102 to modulate the optical carrier wave and other factors related to the transmitter 102 and the receiver 104. In general, an underwater wireless communication system 100 may include a number of additional components within the transmitter 102 and the receiver 104 that perform different functions to improve overall efficiency and performance of the communication link.

Figure 3:
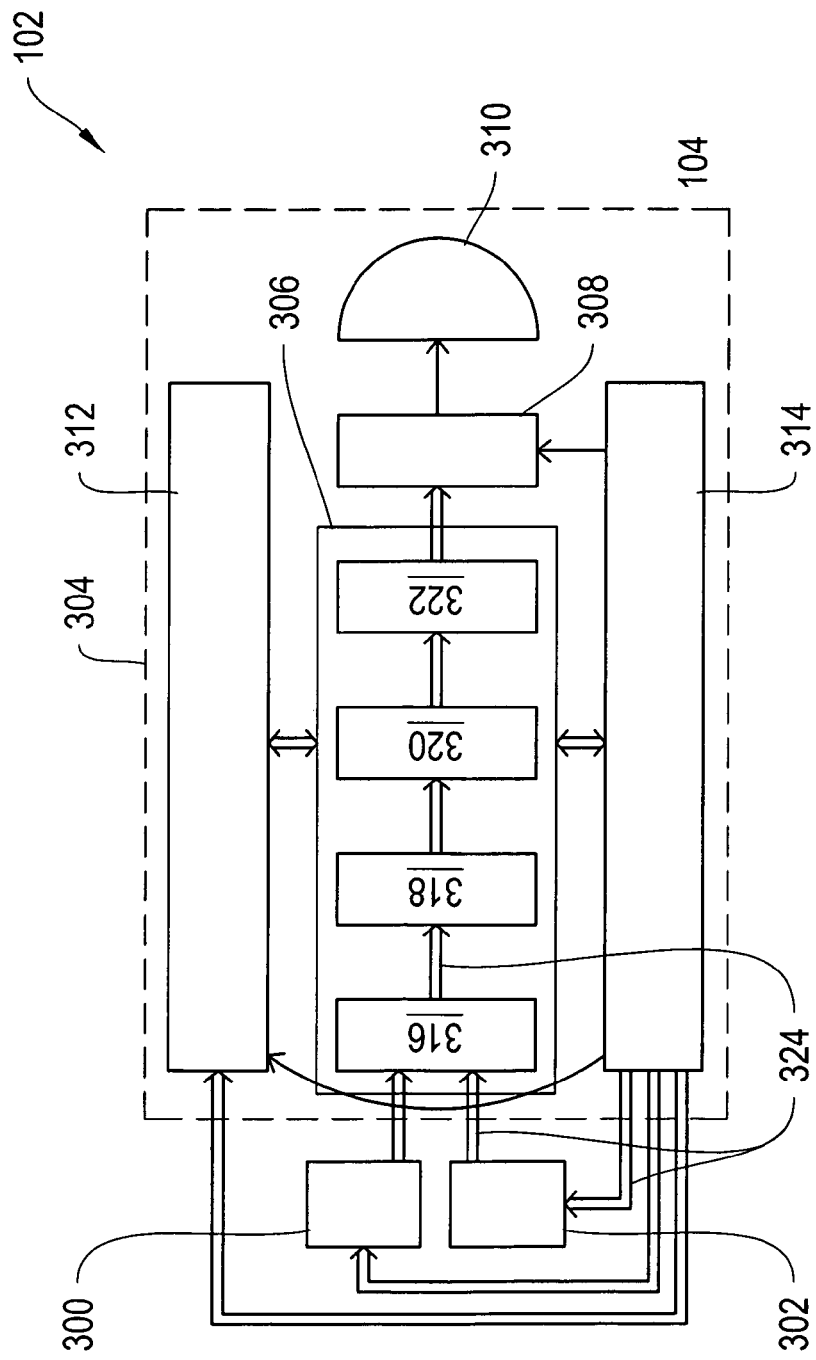
FIG. 3 is a more detailed block diagram of a transmitter according to one illustrative embodiment of the invention.

FIG. 3 depicts a more detailed view of a transmitter 102, connected to input devices including a data element 300 and a control element 302. The transmitter 102 comprises a waterproof enclosure 304 that houses a microprocessor 306, an oscillator 308, a directional element 310, a memory 312 and a power supply 314. The microprocessor 306 includes a data interface module 316, a protocoubuffer module 318, a coding module 320 and a modulating module 322. Elements are electrically connected to each other by interconnect bus 324. The transmitter 102 receives an input signal containing information to be transmitted from input devices including the data element 300 and the control element 302.

Data element 300 includes sensors that typically acquire information from the surrounding environment such as temperature, pressure, gaseous composition, visual appearance. In one embodiment, a data element 300 may include at least one of a temperature sensor, a moisture sensor, a pressure sensor, a gas sensor, a light sensor and a video camera. In another embodiment, the data element 300 may include a laser induced breakdown spectrometer, Raman spectrometer or mass spectrometer. The data element 300 may include other devices that collect information from the surrounding environment. The data element 300 typically generates a data signal that contains information sensed from the surrounding environment. The data signal generated by the data element may include electrical DC or AC signals having characteristics representative of the information collected. For example, the amplitude of a DC electrical signal may be representative of the temperature of the surrounding environment.

Control element 302 includes devices that typically output a control signal. The control signal may control the operation of other devices. For example, the control element 302 may include a joystick that outputs a directional control signal. The directional control signal may be transmitted to a vehicle and then the signal may control the direction of movement of a vehicle. Control elements may include at least one of a joystick, a keyboard, a mouse, a keypad and a steering wheel, or a computer program. Control element 302 may also include other devices that are capable of generating a control signal without departing from the scope of the invention. The control signal generated by the control element may include electrical DC and AC signals such that one or more characteristics of the electrical signal may be representative of the control desired.

The transmitter 102 has a waterproof enclosure 304 that houses the transmitter components and prevents damage to the internal circuitry from water. In one embodiment, the waterproof enclosure 304 may be formed from suitable waterproof or water impermeable material. In particular, the water proof material may be formed from fine polyester/nylon blends, rubber or plastic, hydrophobic material or other non-porous materials and may include suitable sealants. The waterproof enclosure 304 may include at least one layer of NEOPRENE® or GORETEX®. In other embodiments, the waterproof enclosure 304 may formed by coating a layer of waterproof material on a non-waterproof material. The waterproof enclosure 304 may also have one or more layers of material that may be impermeable to other liquids and gases. The waterproof enclosure 304 may also have of one or more layers of material that may be resistant to high temperature and pressure (e.g., high-temperature and high pressure at ocean depths of greater than 300 m). In other embodiments, the waterproof enclosure 304 may comprise of one or more layers of material that may be resistant to corrosive and abrasive substances. In still other embodiments, the waterproof enclosure 304 may comprise of one or more layers of material that may be resistant to abuse from wildlife. In certain embodiments, a portion of the waterproof enclosure 304 may be formed from a material that allows the signal to be transmitted, to pass through. As an example, for optical communication, a portion of the waterproof enclosure 304 may be formed from a transparent material to allow light rays to pass through. The waterproof enclosure 304 substantially prevents environmental damage to the transmitter 102 and its various internal components including the sensitive electronic circuit within the microprocessor 306.

As noted above, the microprocessor 306 includes a data interface module 316, a protocol/buffer module 318, a coding module 320 and a modulating module 322. The input devices send their input signals to the transmitter 102 through the data interface module 316. The data interface module 316 includes circuitry to convert the input signals from the input devices to a format suitable for communication. The input signals may include signals having different formats such as signals formatted as packet data for Internet communication, and signals formatted as a serial bit stream or parallel bit stream. The input signals may be of differing types such as analog signals and digital signals. The data interface module 316 is configured to convert analog input signals to digital signals which may easily be manipulated by the microprocessor. The data interface module 316 may include an analog-to-digital (A/D) converter circuit. The data interface 316 may also be equipped with multiplexing circuitry to allow a plurality of input signals from at least one of a data element and a control element. In one embodiment, the data interface 316 converts input signals to a formatted digital signal having serial format. In such an embodiment, the input signal is formatted for wireless optical communication such that the input signal is first transformed to a serial bit stream. The serial bit stream may then be buffered and further processed by other modules in the microprocessor 306 including the protocol/buffer module 318.

The protocol/buffer module 318 includes circuitry to prioritize, order and buffer the formatted input signal. Typically, the formatted input signal is in digital format wherein the information is represented as a stream of binary digits 0 or 1 (bits). The stream of bits may be broken up into short segments known as packets. All the bits in each packet of bits may be processed together in short bursts of time. The protocol/buffer module 318 buffers the formatted input signal so that the bit rate, packet size, burst length and coding may be adjusted and matched. Buffering allows for a consistent interface with fairly predictable throughput. The protocol/buffer module 318 also includes protocols that may be used to control data flow. As an example, the protocol/buffer module 318 may include a protocol that can be used to control and manage the information being transmitted by different input devices such as instruments, sensors and control devices. Such a protocol may allow for priority control where important data can be given higher priority in systems with multiple data streams. In addition to buffering and protocol adjustment capabilities, the protocol/buffer module 318 may also include buffer circuits that may be configured to amplify the formatted input signal.

The coding module 320 includes circuitry configured to perform the functions of source coding and channel coding. In particular, the coding module 320 performs source coding functions such as data compression in order to limit the size of the data being sent by the communication system. Data compression includes algorithms to reduce the number of bits of digital data being sent while still transmitting all or substantially all information contained in the bit stream. The coding module 320 also performs source coding functions such as data encryption in order to keep the data secure. Data encryption includes algorithms that scramble the digital bit stream such that any unauthorized interception might produce an undecipherable sequence of bits. The coding module 320 typically includes algorithms and circuits to compress and encrypt the formatted input signal. Particularly, the coding module 320 may be programmable such that compression and encryption algorithms may be programmed directly onto it. The coding module 320 may also be configured to perform channel coding functions such as error correction codes to improve the signal-to-noise ratio and lower error rates. Channel coding is typically a methodology of encoding data that adds patterns of redundancy. Error correction codes are applied to the formatted input signal and allow an error during transmission to be localized and corrected by a receiver 104. In one embodiment, the coding module 320 may be a software program implemented in the microprocessor 306. The formatted, compressed, encrypted and error-corrected input signal ("prepared signal") is then sent to a modulating module 322. The signal to be modulated typically comprises packets of bits of data that contains information from the input signal in a compressed form as well as additional encryption bits and error-correction bits The modulating module 322 modulates the formatted, compressed, encrypted and error-corrected input signal ("prepared signal"). Modulation is the operation performed on the signal to allow it to be transmitted over the communication channel 108 in the communication medium 106. In one example, in order to transmit a signal over an optical channel underwater, electromagnetic waves in the visible spectrum between 300 nm and 800 nm have to be modulated with the information containing input signal. In such an example, the modulating module 322 may be configured with a modulation algorithm such that the input signal may be encoded in the carrier signal generated by the oscillator 308. In one particular embodiment, the modulation method implemented in the modulating module 322 is on-off keying ("OOK"). OOK is a type of modulation that represents the digital input signal as the presence or absence of a carrier signal. In its simplest form, the presence of a carrier signal for a specific duration represents a binary one, while its absence for the same duration represents a binary zero. Some more sophisticated schemes vary these durations to convey additional information. In another embodiment, the modulation method implemented in the modulating module 322 is pulse-position modulation ("PPM"). PPM uses a train of pulses with a fixed amplitude and width. PPM is a type of modulation where the position of each pulse, in relation to the position of a recurrent reference pulse, is varied by the information contained in the prepared signal. In PPM, while the position of the pulse may be modulated, the amplitude of reference pulse is generally maintained fairly constant and consequently the transmitted power is also maintained substantially constant. Other modulation methods may be implemented in the modulating module 322 without departing from the scope of the invention. The modulating module 322 typically works in conjunction with the oscillator 308 such that scheme of operation of the oscillator 308 is linked to the modulation method adopted by the modulating module 322.

The oscillator 308 includes circuitry that can generate carrier waves of a desired wavelength and intensity. In one embodiment, oscillator 308 includes circuitry to generate electromagnetic carrier waves. In another embodiment, the oscillator 308 includes circuitry to generate acoustic carrier waves. In one embodiment, the oscillator 308 includes a light source to generate electromagnetic carrier waves in the optical wavelength. In such an embodiment, the light source selected will be in the blue-green region of the spectrum to take advantage of the low attenuation. In other embodiments, the light source may include an arc lamp, an incandescent bulb which also may be colored, filtered or painted, a lens end bulb, a line light, a halogen lamp, a light emitting diode (LED), a chip from an LED, a neon bulb, a fluorescent tube, a fiber optic light pipe transmitting from a remote source, a laser or laser diode, or any other suitable light source. Additionally, the light sources may be a multiple colored LED, or a combination of multiple colored radiation sources in order to provide a desired colored or white light output distribution. For example, a plurality of colored lights such as LEDs of different colors (red, blue, green) or a single LED with multiple colored chips may be employed to create white light or any other colored light output distribution by varying the intensities of each individual colored light. In one embodiment, the light source includes high intensity blue LEDs such as those fabricated from Gallium Indium Nitride (InGaN) on a silicon carbide (SiC) substrate.

The oscillator 308 may also include electronic drive circuits to control the operation of the oscillator 308. The electronic drive circuits may include various configurations of switching devices such as field effect transistors (FETs) and bipolar transistors. In particular, FETs include metal oxide semiconductor FETs (MOSFETs) and HEXFET™ manufactured by International Rectifier, El Segundo, Calif., U.S.A. In certain embodiments, the switching devices may be configured in designs including emitter coupled logic (ECL), a cascode configuration, and a totem pole. The electronic drive circuits may also include other switching devices configured to operate at a switching frequency of about 10 MHz to about 200 MHz and capable of driving the oscillator 308 at around 500 mA.

The oscillator 308 working in conjunction with the modulating module 322 generates modulated carrier waves in the optical wavelengths such that the information contained in the prepared signal modulates a characteristic of the carrier wave. In one example, the intensity of the light source in the oscillator 308 is modulated according to the information in the prepared signal, using the OOK modulation method, to generate a modulated carrier wave. The modulated carrier wave can then be collimated with additional lenses to focus the transmitted beam in a particular direction. The modulated carrier wave can also be coupled to an etalon (e.g., Fabry-Perot Etalon) to further modulate the characteristic of the transmitted beam. The direction of the modulated carrier signal can be adjusted by the directional element 310.

The directional element 310 includes elements that are used to control the direction of propagation of the modulated carrier waves. Each wave may propagate in a different direction and the orientation of the modulated carrier waves as they propagate in the communication medium 106 may be visualized as a two- or three-dimensional wavefront. A wavefront can be described as a two- or three-dimensional surface through which the modulated carrier waves pass such that the phase of all or substantially all waves at any point on a given surface may be the same. As an example, a wavefront may be a plane that corresponds to waves that are parallel to each other (collimated beam). In one embodiment, the directional element 310 includes a diffuser. Diffusers are configured to diffuse the modulated carrier waves in a plurality of different directions. In certain embodiments the diffuser may include at least one of a discrete reflective element, a discrete refractive element and a high transmission scattering medium. Discrete reflective elements such as parabolic mirrors may reflect light in a plurality of different directions. Discrete refractive elements such as curved lenses may refract light in a plurality of different directions. High transmission scattering mediums such as transmission gratings have uneven surfaces so that they may scatter light in a plurality of directions. Diffusers may be configured to diffuse modulated carrier waves such that the modulated carrier waves describe a hemispherical wavefront. Diffusers may also be configured to diffuse modulated carrier waves such that the modulated carrier waves describe a cylindrical wavefront. Hemispherical diffusers typically have a wide field of view because the modulated carrier waves propagate in all directions along the radius of a hemisphere with the oscillator 308 located in the center. Diffusers may include a mixture of $TiO_2$ and silicone. In other embodiments, the diffusers may include ground glass or sandblasted glass. The directional element 310 may include other types of diffusers as described in U.S. Pat. No. 6,071,302, the entire contents of which is incorporated herein by reference. A more detailed description of hemispherical propagation is provided with FIG. 6. The directional element 310 may include a plurality of stationary optical elements such as lenses and gratings. The directional element 310 may typically not require electrical power. However, other components in the transmitter 102 may require electrical power supply.

Power supply 314 typically provides the necessary power to run the various components in the transmitter 102. More particularly, the power supply 314 provides electrical power to operate the microprocessor 306, oscillator 308 and memory 312. The power supply 314 also supplies power to the input devices such as the data element 300 and the control element 302. In one embodiment, the power supply 314 may be configured to provide DC or AC electrical power. The power supply 314 may be a battery. The power supply 314 may also be rechargeable such that the stored energy may be replenished when connected to a charger. The power supply 314 may include circuitry to perform power converting operations such as AC to DC or DC to AC. The power supply 314 may also include circuitry to perform power converting operations such as DC to DC or AC to AC. The power supply 314 may also be configured to generate power from the temperature and pressure of the surrounding environment. In one embodiment, the power supply 314 may be configured to control the operation of the transmitter 102 such that the operation of the transmitter 102 may be separate from the operation of the input devices. In such an embodiment, the transmitter 102 may be operated at different times from the input devices. The power supply 314 may also be configured to operate the microprocessor 306 and oscillator 308 separate from the memory 312. The memory 312 may be operated separately in situations where the transmitter is in a power save mode and the stored information in the memory 312 is kept from being lost.

The memory 312 typically includes a main memory and a read only memory. The memory 312 may also include mass storage components having, for example, various disk drives, tape drives, etc. The mass storage may include one or more magnetic disk or tape drives or optical disk drives, for storing data and instructions for use by the microprocessor 306. The memory 312 may also include one or more drives for various portable media, such as a floppy disk, a compact disc read only memory (CD-ROM), or an integrated circuit non-volatile memory adapter ( i.e. PC-MCIA adapter) to input and output data and code to and from microprocessor 306. The memory 312 may also include dynamic random access memory (DRAM) and high-speed cache memory. The memory 312 communicates with the microprocessor 306 to store vital information such as protocol, coding and modulating algorithms. The memory 312 communicates with the microprocessor 306 through interconnect bus 324.

The interconnect bus 324 includes a set of wires that electrically connect various components within the transmitter 102. In one embodiment, the interconnect bus 324 may also include a set of wires that electrically connect the input devices to the transmitter 102. In such an embodiment, the interconnect bus 324 may be sealed with the waterproof enclosure 304 such that there is no gap between the interconnect bus 324 and the waterproof enclosure 304.

In operation, the data element 300 may measure characteristics of the surrounding environment and generate and input signal in response to the value of the particular characteristic being measured. Control element 302 may also generate an input signal in response to a user or computer initiated control sequence. The input signal may be sent through interconnect bus 324 to the transmitter 102. In particular the input signal is received by the microprocessor 306 and data interface module 316. The data interface module 316 converts the input signal to a format suitable for communication such as a stream of digital data (bits). The formatted input signal is sent from the data interface module 316 to the protocol/buffer module 318 through an interconnect bus 324. The protocol/buffer module rearranges and reformats the data in order to prioritize and buffer the formatted signal. Multiple data streams obtained from both the data element 300 and the control element 302 may be multiplexed and prioritized so that important data is processed first. The data stream may be sent from the protocoubuffer module 318 to the coding module 320 through the interconnect bus 324.

The coding module 320 compresses the data stream to reduce the number of bits being transmitted while still keeping all or substantially all of the information from the original data stream. The coding module 320 also encrypts the data stream by scrambling the bits in the data stream to prevent unauthorized interception of the information in the data stream. The coding module 320 further applies error correction algorithms to the data stream by adding suitable error correcting bits so that the error caused by noise and interference in the communication medium is corrected. The coding module 320 sends the compressed, encrypted, error corrected and formatted signal ("prepared signal") through the interconnect bus 324 to the modulating module 322.

The modulating module 322 is connected to the oscillator 308 through interconnect bus 324. The modulating module 322 and the oscillator 308 operate together to modulate a carrier wave generated by the oscillator 308 with the prepared signal data stream using a suitable modulation algorithm. In one example the transmitter is an optical transmitter and the oscillator 308 generates carrier waves in the optical wavelengths of the electromagnetic spectrum. The modulated optical carrier wave is then sent through suitable stationary optical elements such as lenses to a directional element 310 such as a diffuser. The directional element propagates the modulated carrier waves in one or more suitable directions. In one example, the diffuser propagates the modulated carrier waves in a plurality of directions such that the wavefront due to the modulated carrier waves describes a surface of a hemisphere. The transmitted signal may then be received by a receiver 104 as described in more detail below.

Figure 4:
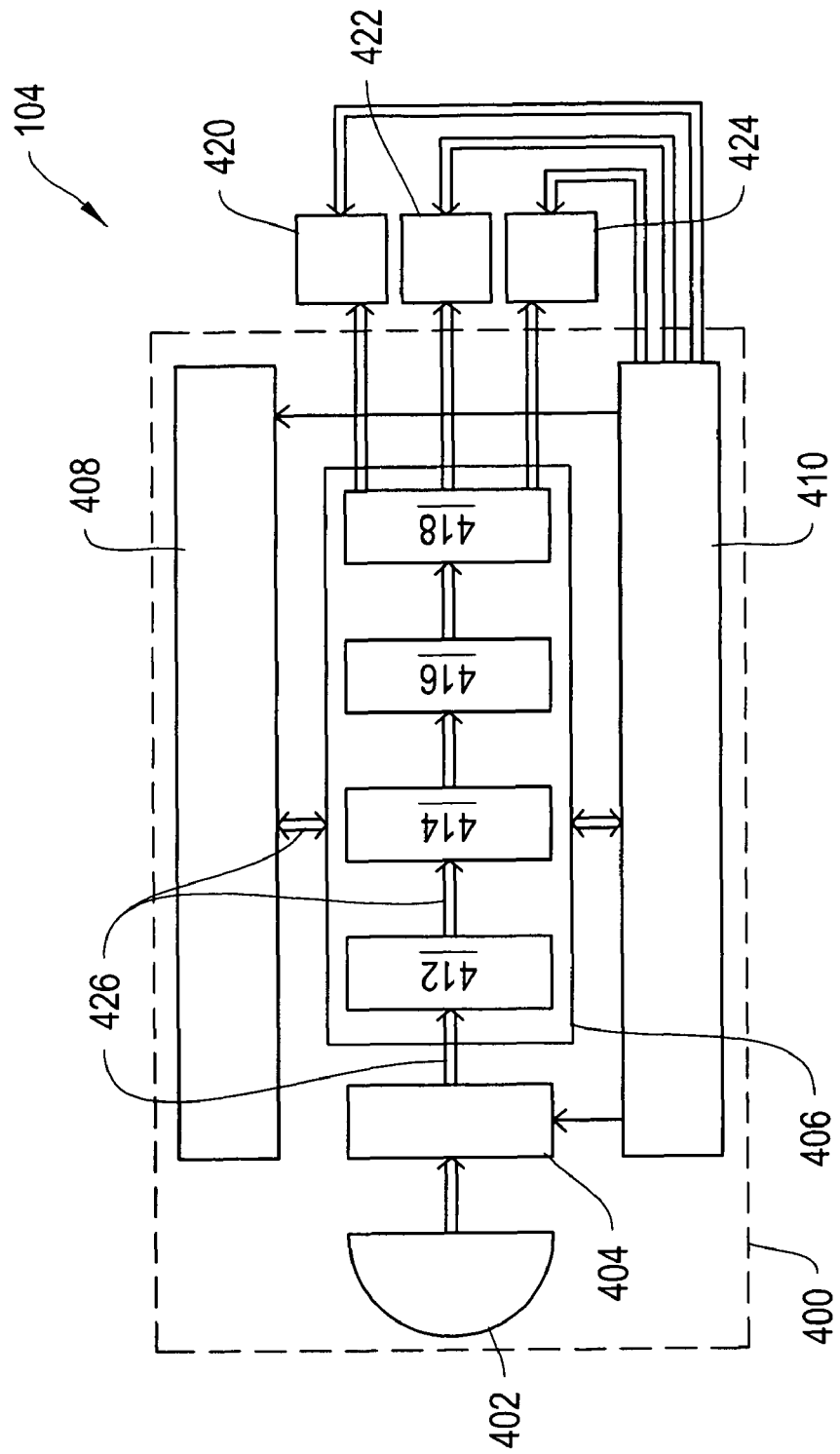
FIG. 4 is a more detailed block diagram of a receiver according to one illustrative embodiment of the invention.

FIG. 4 depicts a more detailed view of a receiver 104. The receiver 104 comprises a waterproof enclosure 400 that houses a directional element 402, a detector 404, a microprocessor 406, a memory 408 and a power supply 410. The microprocessor 406 includes a demodulating module 412, a decoding module 414, a protocol/buffer module 416 and a device interface module 418. The receiver 104 is connected to output devices such as a computer 420, a data element 422, or a analog element 424. Components are electrically connected to each other by interconnect busses 426.

The receiver 104 comprises a waterproof enclosure 400 that houses the receiver components and prevents any damage to the internal circuitry from water or damaging substances. The waterproof enclosure 400 is formed in a similar manner to the waterproof enclosure 304 in FIG. 3. The waterproof enclosure 400 substantially prevents environmental damage to the receiver 104 and its various internal components including the sensitive electronic circuit within the microprocessor 406. A transmitted signal (for e.g. a modulated carrier wave sent by the transmitter 102) may be received at the directional element 402 in the receiver 104.

The directional element 402 includes elements that are used to control the direction from which the transmitted signals are received. As noted earlier, the orientation of the transmitted signals as they propagate in the communication medium 106 may be visualized as a two- or three-dimensional wavefront. A wavefront can be described as a two- or three-dimensional surface through which the modulated carrier waves pass such that the phase of all, or substantially all, waves at any point on a given surface may be the same. As an example, a wavefront may be a plane that corresponds to waves that are parallel to each other (collimated beam). In one embodiment, the directional element 402 includes a diffuser. Diffusers are configured to receive transmitted signals arriving from a plurality of different directions. Diffusers in directional element 402 may be formed in a similar manner to diffusers in directional element 310 of FIG. 3. In certain embodiments the diffuser may include at least one of a discrete reflective element, a discrete refractive element and a high transmission scattering medium. Diffusers may be configured to receive transmitted signals such that the transmitted signals describe a hemispherical wavefront. Hemispherical diffusers typically have a wide field of view because it can receive signals from all directions along the radius of a hemisphere. The directional element 402 may include a plurality of stationary optical elements such as lenses and gratings. In certain embodiments, the directional element 402 may be configured to include tracking elements and actuators. The tracking elements such as acoustic sensors and actuators allow the receiver 104 to reorient itself so that it can aim and track signals arriving from a particular direction. The received signal is sent to a detector 404

The detector 404 receives the transmitted signal from the directional element 402 such that the information in the transmitted signal may be processed by electronics in the receiver 104 as well as outside of the receiver 104. As an example, in optical communication where the transmitted signal is the optical wavelength range of the electromagnetic spectrum, the detector 404 may be configured to detect the optical transmitted signal and convert the signal to an electrical signal so that the electronics in the microprocessor 406 may process the information in the transmitted signal. In one embodiment, the detector 404 may be configured to detect electromagnetic waves. The detector 404 may also be configured to detect electromagnetic waves in the optical spectrum. In such an embodiment, the detector 404 may include a photomultiplier tube (PMT). In other embodiments the detector 404 may include at least one of a charge coupled device (CCD), a CMOS detector and a photodiode. PMTs typically provide higher sensitivity and lower noise than photodiodes. The spectral response of bialkali PMTs typically peak in the blue wavelength range with a quantum efficiency of about 20%. Their gain is typically on the order of $10^7$. In certain embodiments, the detector 404 may be formed together with the directional element 402. As an example, hemispherical PMTs such as the HAMAMATSU® R5912 combine hemispherical directional element 402 with a detector 404. The detector 404 sends the detected signal (typically a value of electrical current corresponding to the intensity of the received electromagnetic radiation) to a demodulating module 416.

The demodulating module 412 includes circuitry that is configured to demodulate the detected signal. Demodulation is the operation performed on the signal to remove the underlying carrier wave and extract the information that was initially used by a transmitter 102 to modulate the signal. As an example, in an optical communication system where the information was initially modulated by varying the intensity of the carrier wave the demodulating module 412 includes circuitry that is configured to measure and extract the variations in intensity of the received signal in order to extract the information. The underlying carrier wave having a fixed intensity and a frequency in the optical spectrum is typically removed. In one embodiment, the demodulating module 412 is aware of the modulation scheme used by the modulating module 322 in a transmitter 102. The demodulated signal may be sent from the demodulating module 412 to a decoding module 414.

The decoding module 414 includes circuitry configured to perform the functions of channel decoding and source decoding. In particular, the decoding module 44 may be configured to perform channel decoding functions such as analyzing the error correction codes in the demodulated signal in order to improve the signal-to-noise ratio and lower error rates. The decoding module 414 localizes and removes error in the demodulated signal by checking the error correction codes added in the signal by the coding module 320 of the transmitter 102 in FIG. 3. In one embodiment, the decoding module 414 may be a software program implemented in the microprocessor 406. The decoding module 414 also performs source decoding functions such as data decompression to restore the data to its original size before being compressed by the coding module 320. Data decompression reinstates the bits of digital data so that the information contained in the demodulated signal may be substantially matched with the information in the input signal. The decoding module 414 also performs source decoding functions such as data decryption to read encrypted data. Data decryption unscrambles the digital bit stream such that any scrambled bits may be restored and the data may be processed. The decoding module 414 typically includes algorithms and circuits to decompress and decrypt the detected input signal. Particularly, the decoding module 414 may be programmable such that decompression and decryption algorithms may be programmed directly onto it. The decoded signal may be sent from the decoding module 414 to the protocol/buffer module 416.

The protocol/buffer module 416 includes circuitry to prioritize, order and buffer the decoded signal. The protocol/buffer module 416 mirrors the protocol/buffer module 318 in the transmitter 102 of FIG. 3. The protocol/buffer module 416 also includes protocols that may be used to control data flow. As an example, the protocol/buffer module 416 may include a protocol that can be used to control and manage the information being received from different input devices. Such a protocol may allow for priority control where important data received may be given higher priority in systems with multiple data streams. In addition to buffering and protocol adjustment capabilities, the protocol/buffer module 416 may also include buffer circuits that may be configured to amplify the decoded signal.

The device interface module 418 includes circuitry to convert the decoded signals from the protocol/buffer module 416 to a format compatible with an output device. In one embodiment, the device interface module 418 is configured to convert the digital decoded signals from a packetized format to a serial stream of bits better suited for short range communication with a computer. In another embodiment, the device interface module 418 may also include a digital-to-analog (D/A) converter circuit such that the digital decoded signal may be converted to an analog output format. The analog output signal may then be used to drive a motor circuit. The device interface 418 may also be equipped with demultiplexing circuitry to generate a plurality of output signals from at least one decoded signal. At least one output signal may be sent from the device interface 418 to an output device such as a computer 420, data element 422 and motor element 424.

The computer 420 may include any computer system having a microprocessor, a memory and a microcontroller. The computer system 420 may receive an output signal from the device interface 418 and execute a program to perform a particular function. For example in response to an output signal, the computer 420 may execute a program to control the operation of a remote vehicle. The data element 422 may be configured in a similar manner to data element 300 in FIG. 3. Analog elements 424 may include output devices that are operated by analog output signals. Analog elements 424 may include motors and actuators such that the output signal sent from the device interface 418 may be applied directly (or through a driver circuit) to operate the motor or actuator. The output devices may be powered by a power supply 410 that also powers the receiver 104.

The receiver 104 is further configured to include a memory 408 and a power supply 410. The memory 408 and the power supply 410 are formed and operated in a similar manner to memory 312 and power supply 314, respectively, in FIG. 3.

The receiver 104 may also include an Automatic Gain Control (AGC) module that controls the received power of the signal so that the received power is maintained fairly constant for different ranges. In particular, the AGC limits the power of the received signal transmitted over a short distance.

In operation, the directional element 402 receives the transmitted signal from one or more directions. In one example, the directional element 402 may be a diffuser that receives the transmitted signal from a plurality of directions such that the wavefront due to the received signal describes a surface of a hemisphere. The detector 404 may receive the transmitted signal from the directional element such that information in the transmitted signal may be processed by the receiver electronics. The detected signal is sent from the detector to the demodulating module 412. The demodulating module 412 removes the underlying carrier wave from the detected signal leaving behind a stream of binary digits that represents the information originally transmitted. The demodulated signal is sent from the demodulating module 412 to the decoding module 414. The decoding module 414 performs source and channel decoding such that the information in the demodulated signal is decompressed, decrypted and corrected for any error that may have been picked up during transmission. The signal is sent from the decoding module 414 to the protocol/buffer module 416. The protocol/buffer module 416 prioritizes and buffers the data so that data flow may be controlled. The signals are sent from the protocol/buffer module 416 to the device interface module 418. The device interface module 418 converts the signal to a format suitable for output to an output device. The receiver 104 and the transmitter 102 may be combined to communicate with other receivers 104 and transmitters 102 in a communication network.

Figure 5:
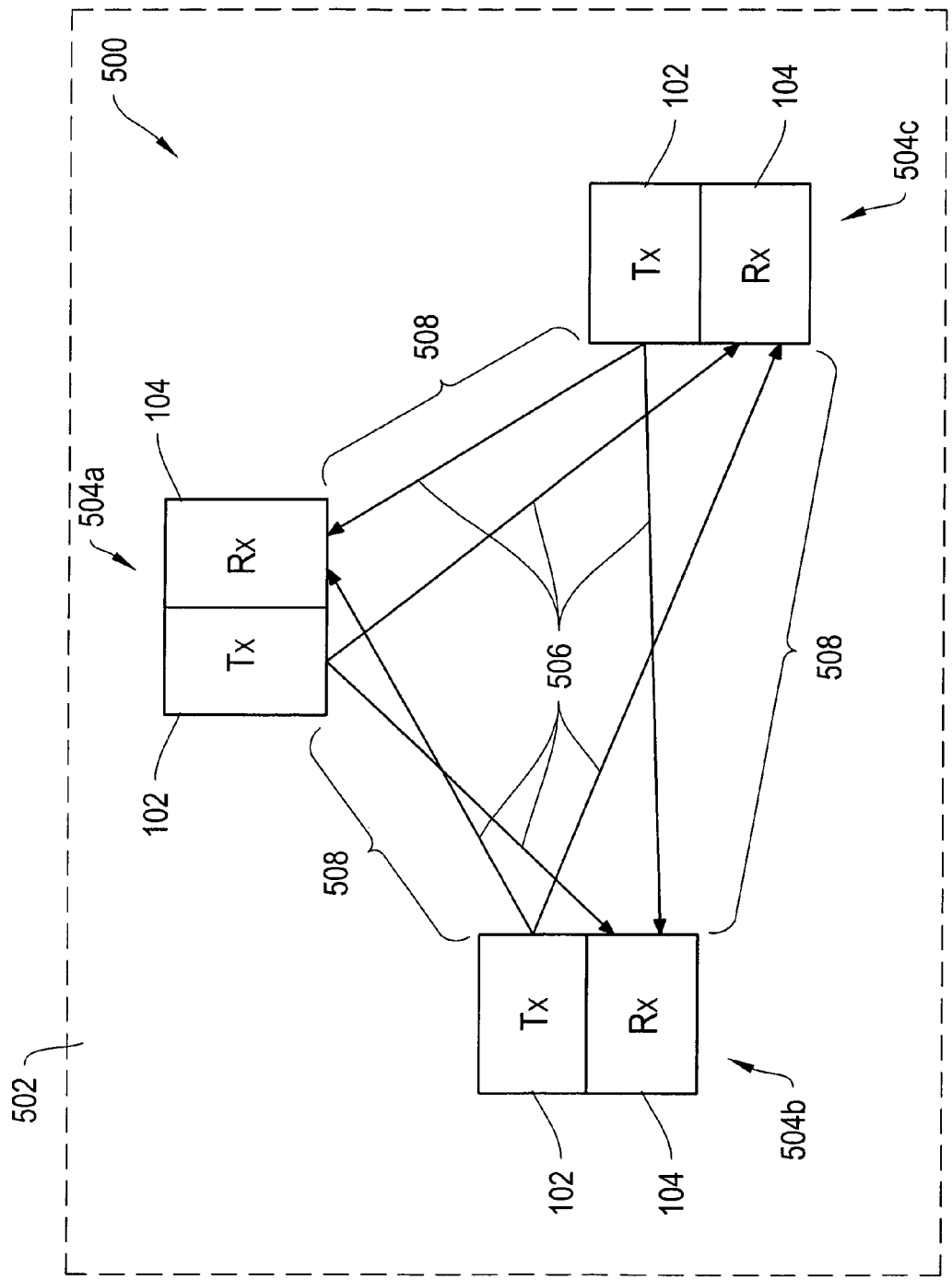
FIG. 5 is a network architecture for an underwater communication system according to one illustrative embodiment of the invention.

FIG. 5 depicts an underwater wireless optical communications network 500 (generally "network 500") including three optical modems 504*a*-504*c* (generally "optical modem 504"), each having a transmitter 102 and receiver 104 such that the optical modems 504 can communicate with each other across an underwater communication medium 502. The transmitters 102 and receiver 104 in the optical modems 504 send and receive information from each other along the direction of the arrows 506. The optical modems are shown to be separated from each other by a distance 508 typically defined by a range for optical communication underwater.

The optical modems 504 may be able to conduct bidirectional communication where each optical modem 504 can both send and receive optical signals. The optical modem 504*a* may transmit signals to both optical modems 504*b* and 504*c*. The optical modem 504*a* may also receive signals from both optical modems 504*b* and 504*c*. Similarly, optical modems 504*b* and 504*c* can communicate with each other as well as with optical modem 504*a*. In one embodiment, the optical modem 504 may be installed in a stationary unit. In another embodiment, the optical modem 504 may also be installed in a mobile unit.

The optical modem 504 may include components and circuitry in addition to those depicted without departing from the scope of the invention. For example, the optical modem 504 may include components such as a network interface to enable it to connect to an external network. Such a network interface may be accomplished by linking the computer 420 connected to receiver 104 with an external network. A network interface may also be accomplished by linking the input devices connected to transmitter 102 with an external network.

The transmitter 102 and receiver 104 in the optical modem 504 may configured such that some of their components may be shared. For example, the microprocessor 306 in transmitter 102 and the microprocessor 406 in receiver 104 may be combined into a single microprocessor performing both transmission and reception operations. As another example, the transmitter 102 and the receiver 104 may be housed under a common water proof enclosure.

In one embodiment, the transmitter 102 in the optical modem 504 may include a directional element 310 comprising a diffuser, an oscillator 308 comprising a PMT and a modulating module 322 implementing an OOK modulation scheme. In such an embodiment, the diffuser may be a hemispherical optical element such that the transmitter 102 sends optical signals in a plurality of directions described by a hemispherical wavefront, and the receiver 104 receives optical signals from a plurality of directions described by a hemispherical wavefront.

The type and configuration of the directional element in both the transmitter and receiver, among other things, can play a role in the arrangement of the optical modems 504 in the network 500. For example, in a network of two or more optical modems 504, if the transmitter directional element in each optical modem 504 was selected to be a collimator such that the optical signals are transmitted in a single beam along a particular direction, and the receiver directional element in each optical modem 504 is configured to receive along a particular direction, then the optical modems 504 have to be arranged such that not only are they in each others line of sight, but they also have to be pointing towards each other in order to communicate. As another example, if the directional elements on the transmitter 102 and receiver 104 were selected to be diffusers having hemispherical optical elements, as noted earlier, then the optical modems 504 may have to be arranged in locations that are located in any position in front of (on the curved side of the hemisphere) the hemisphere. Such directional elements permit omni-directional communication where the optical modems 504 may be located in a plurality of positions in front of each other. FIG. 6a, 6b or 6c describe the operation of hemispherical diffusers used in optical modems 504.

The location of the optical modems 504 in the network 500 may also be limited by the distance 508 between them. In one embodiment, the maximum distance 508 between the optical modems 504 in the network 500 is limited by the allowed range of optical communication underwater. As noted earlier, the range of optical communication underwater is influenced by many factors and a more detailed description of the limits of the range of an optical modem 504 with a hemispherical directional element is provided with FIG. 7.

In addition to the range, the throughput of the optical communication link 506 between optical modems 504 may vary depending on some factors including the nature of the communication medium and factors related to the configuration of the transmitter 102 and the receiver 104.

FIG. 6A shows a graph 600 that depicts the operation of the hemispherical diffuser in the optical modem 504. The x-axis 602, y-axis 604 and the z-axis 606 show directions in a three-dimensional space. The axes 602, 604 and 606 meet at the origin 608. A diffuser 310 is located at the origin and is in communication with a transmitter and oscillator 308. The oscillator may be light source used for optical communication. The direction of propagation of light from the light source 308 after being diffused by the diffuser 310 is shown by arrows 610.

The diffuser 310 is shown to be of roughly hemispherical shape. The diffuser 310 may be typically formed from optical elements having a hemispherical shape. The diffuser 310 is positioned such that the flat portion of the hemisphere is located on approximately the plane formed by the x-axis 602 and the y-axis 604 ("x-y plane") such that the flat portion is parallel to the x-y plane and the center of the hemisphere coincides with the origin 608. The light source 308 is located just below the origin and directs light substantially perpendicular to the x-y plane towards the diffuser 310 placed on top of it. The light rays emanating from the light source 308 may strike the flat portion of the diffuser 310 at a perpendicular angle. The diffuser 310 diffuses the light rays in all directions above the x-y plane on the positive side of the z-axis 606. The diffuser 310 and the light source 308 may be arranged in different configurations (such as the arrangement shown in FIG. 10) without departing from the scope of the invention.

FIG. 6B shows a zoomed out two-dimensional top view 612 of the diffuser-light source arrangement of FIG. 6A. In particular, FIG. 6B illustrates the formation of wavefronts 614a and 614b as the diffused light propagates. A wavefront can spatially be described as a surface through which the light waves pass such that the phase of all or substantially all waves at any point on a given surface may be the same. In the illustrated embodiment of the diffuser 310, the diffused light waves describe a hemispherical wavefront. A hemisphere appears as circle when viewed from above. The circles 614a and 614b represent two wavefronts at different points in time. As the diffused light propagates from the transmitter, at a first time, the wavefront created by light rays describe circle 614a. At a later time, after the first time, the wavefront created by the diffused light rays describe circle 614b. The circle 614b is larger than 614a indicating that over time, light rays propagate over a larger and larger volume.

FIG. 6C shows a zoomed out two-dimensional side view 616 of the diffuser-light source arrangement of FIG. 6A. The wavefronts 614a and 614b are depicted as the diffused light propagates through the positive z-axis 606 volume of space.

As seen in FIG. 6B, FIG. 6C also illustrates that the circle representing wavefront 614b is larger than the circle representing 614a.

A similar arrangement may be duplicated in the receiver where a diffuser may be placed on top of a detector (including a PMT) to receive light from substantially any direction along a radius of the hemisphere. The benefit of a diffuser 310 is that light may be made to propagate in a plurality of directions and light may be received from a plurality of different directions.

Figure 7:
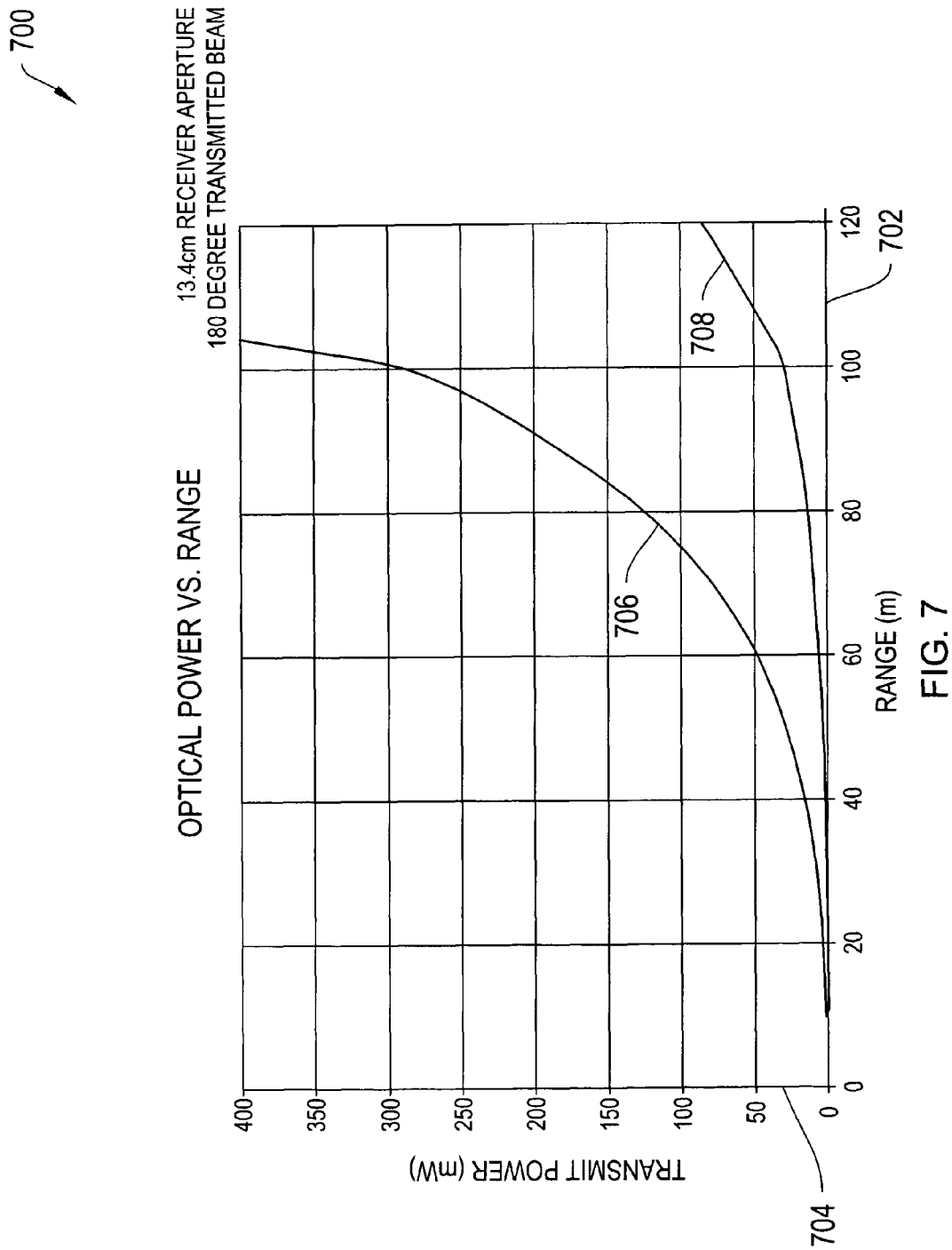
FIG. 7 is a graph depicting the relationship between the average power required to transmit electromagnetic radiation in the optical spectrum and range of transmission.

FIG. 7 shows a graph 700 depicting the relationship between the average optical power and range for a transmitter with a hemispherical diffuser having diffusing characteristics similar to that shown in FIG. 6. The horizontal axis 702 shows the range in meters and the vertical axis 704 shows the optical transmit power in mW. The plot 706 illustrates the average power required for transmission versus the range for data rates of about 1 Mbit/s. The plot 708 illustrates the average power required for transmission versus the range for data rates of about 10 Mbit/s.

The plots 706 and 708 illustrate that the optical power required for establishing an optical communication link underwater for different data transfer rates. At the higher data rates of about 10 Mbit/s, the average power required for transmission is higher than at lower data rates of about 1 Mbit/s. In one embodiment, the optical power required for a range of 100 m at 10 Mbit/s can be achieved with the use of a laser diode light source. The plots 706 and 708 are calculated from the expression for transmitted power using the OOK modulation method shown below:

$$P_{av} = \frac{N_{pe}^s(hc)BR(\pi R^2)(\theta_H \theta_V)4}{\eta \lambda \tau_w \gamma_t \gamma_r \gamma_{fov}(\pi D_r^2)G}$$

Where $\eta$ is the detector quantum efficiency, $\lambda$ is the wavelength in nm, hc is the Planck's constant times the speed of light, $\gamma$ is an optical transmission coefficient, $\tau_w$ is the one-way optical attenuation $D_r$ is the receiver aperture, and G is a factor which accounts for transmitter receiver misalignment, BR is the OOK bit rate, R is the range, $N_{pe}^s$ is the signal (photoelectron counts at the photomultiplier tube) per pulse, $\theta_H$, $\theta_V$ are the half angles of the horizontal and vertical transmitter beam divergences. In the estimate of the plots 706 and 708, $N_{pe}^s$=13.5M, where M is the margin over and above the required signal level at an assumed bit error probability of $10^{-6}$ for OOK.

In certain embodiments, an underwater communication network 500 can be established having a range of about 100 m and data rates of above 1 Mbit/s. Such characteristics are well suited for deep-sea exploration where mobile units may collect information and transmit to stationary units that are connected to surface networks.

Figure 8:
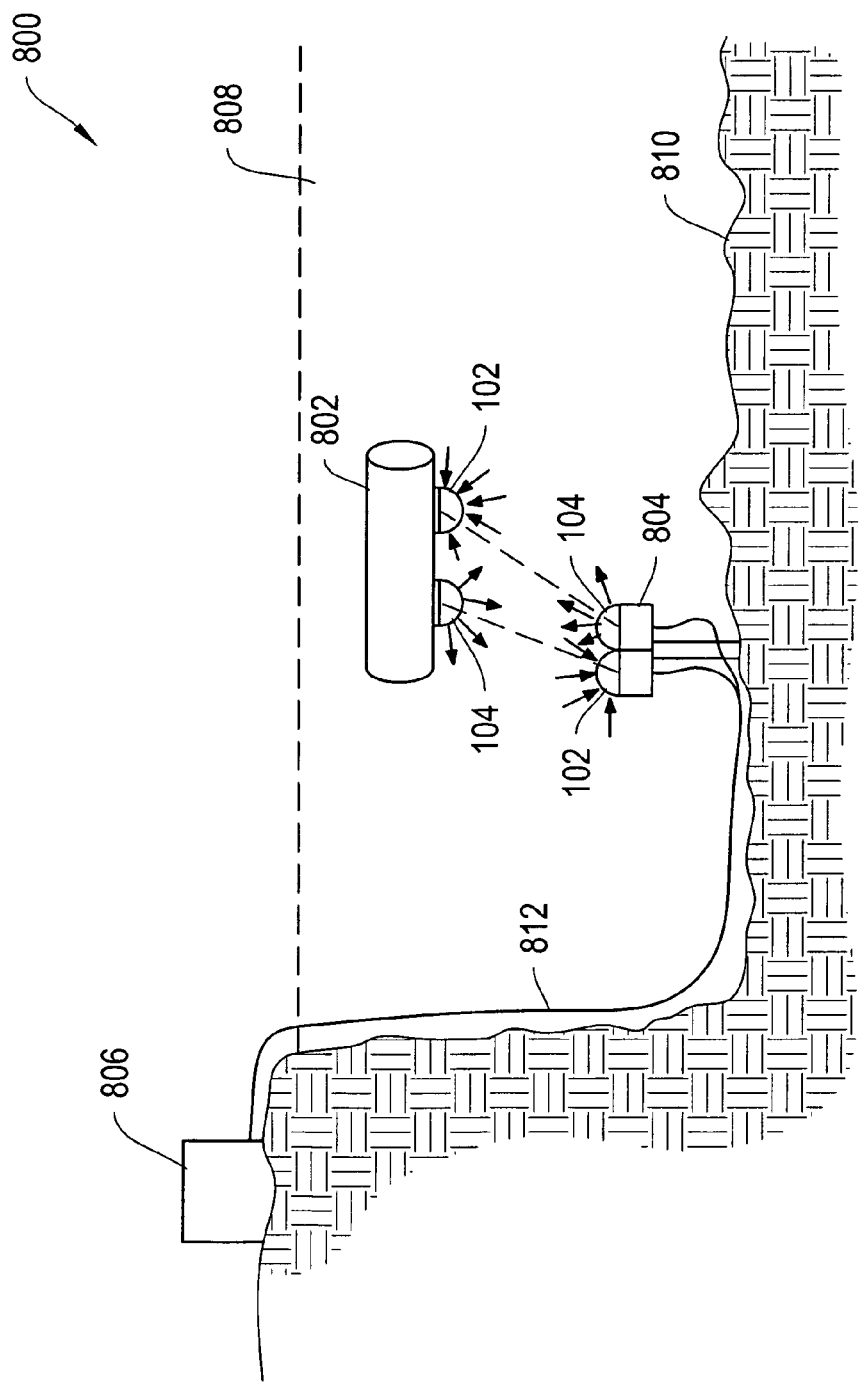
FIG. 8 depicts underwater communication between a seafloor observatory and an unmanned underwater vehicle according to one implementation of the invention.

FIG. 8 depicts underwater wireless communication between a seafloor observatory 804 and underwater unmanned vehicle 802 ("UUV 802") according to one implementation of the invention. Shown in FIG. 8 is an illustration of the underwater wireless communication network setup near the ocean floor 810. A seafloor observatory 804 is tethered to the ocean floor 810 and connected by cable 812 to a land unit 806. A UUV 802 swims in the depths of the ocean 808 near the ocean bed 810. The seafloor observatory 804 and the UUV 802 are shown to each have a transmitter 102 and a receiver 104.

Seafloor observatories 804 comprising optical modems that have a transmitter 102 and receiver 104 may float on short tethers that are attached to the ocean bed 810. The optical modems typically float a sufficient distance above the seafloor to clear topography. The seafloor observatory 804 may also include sensors and optical imaging systems to measure and record ocean phenomena. The measurements may be sent to land units 806 by cable 812. The land unit 806 may be a computer system connected to the Internet. In such an embodiment, the seafloor observatory 804 may be used to provide high-speed broadband Internet to the ocean bed 810. In one embodiment, the seafloor observatory 804 may be connected to a land unit 806 by a cable 812 including fiber optic cables. The cable 812 may be deployed using tethered, remotely operated vehicles (ROV). The land units 806 may be used to send command signals to the seafloor observatory 804 such that the command signal may be transmitted wirelessly to the UUV 802. The transmitter 102 and receiver 104 in the seafloor observatory 804 include hemispherical diffusers such that the seafloor observatory 804 may send and receive optical signals from a plurality of directions.

The UUV 802 may be autonomous, un-tethered, and free-swimming underwater deep-sea vehicles that may be used to study ocean phenomena in places where manned operations may be difficult. For example a UUV 902 may be used to study the regions near hydrothermal vents on the ocean beds. Regions near hydrothermal vents are typically very hot and have toxic substances that are spewed out from the earth's crust. Scientists may study conditions near such hydrothermal vents and other deep-sea ocean phenomena using the information obtained from sensors connected to UUV 802. The UUV 802 may be equipped with different types of sensors and optical imaging devices to study and record natural phenomena in the earth-ocean systems. The UUV 802 may also include high capability sensors such as laser induced breakdown, Raman or mass spectrometers that may otherwise be difficult to place autonomously due cost concerns and rapid evolution of seafloor features which might require a certain degree of mobility. The UUV 802 may be user controlled from the surface through the communication link between the seafloor observatory 804 and the UUV 802 equipped with transmitter 102 and receiver 104. The transmitter 102 and receiver 104 in the UUV 802 also include hemispherical diffusers such that the seafloor observatory 804 may send and receive optical signals from a plurality of directions. The communication network between the UUV 802 and the seafloor observatory 804 may be similar to the optical communication network 500 of FIG. 5 where the range of communication can be around 100 m with data rates of above 1 Mbit/s. The optical modems in the UUV 802 allow bi-directional communication with the seafloor observatory 804. The bidirectional communication enables adaptive sampling of sensor data under user control. The high data rates of over 1 Mbit/s allow the transmission of compressed high-resolution video as well as allow nearly unrestricted motion and sensor control. The bi-directional communication link between the UUV 802 and the seafloor observatory 804 may be made asymmetric such that the throughput from the UUV 802 to the seafloor observatory 804 may be much higher than the throughput from the seafloor observatory 804 to the UUV 802. As an example, in a system comprising data uplink (sensor data from the UUV 802 to the seafloor observatory 804) and command downlink (command information from the seafloor observatory 804 to the UUV 802), the percentage throughput of the data uplink may be about 95%. In addition to high data rates, a high range of about 50 m-100 m allows for a wide field of motion. A UUV 802 may be able to explore volumes of water on the order of about $2 \times 10^6$ m$^3$ per seafloor observatory or other communication unit.

Figure 9:
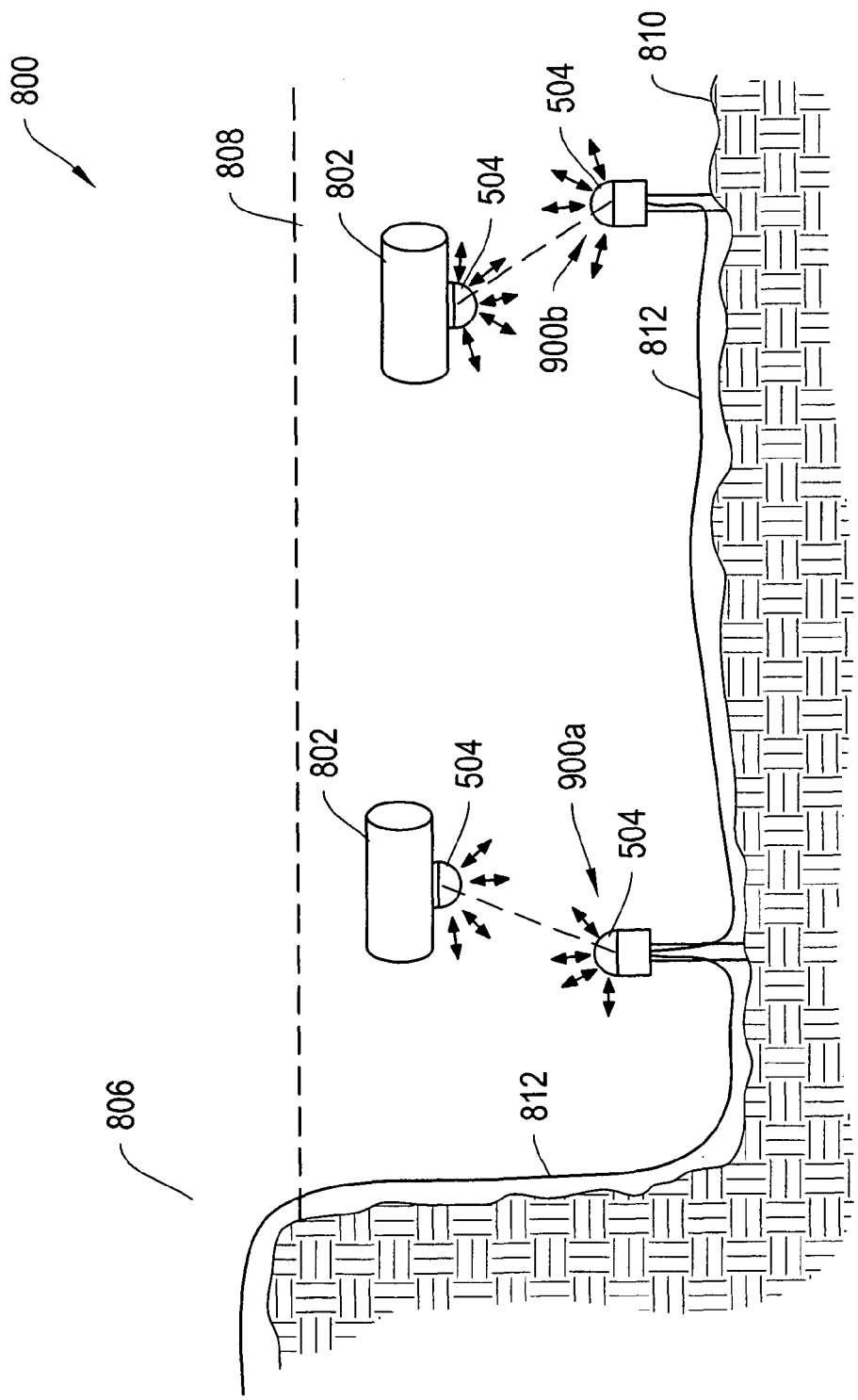
FIG. 9 depicts underwater communication between an underwater unmanned vehicle and two seafloor observatories according to one implementation of the invention.

FIG. 9 depicts underwater wireless communication between two seafloor observatories 900a and 900b and an exploring underwater unmanned vehicle 802 ("UUV 802") according to one implementation of the invention. FIG. 9 illustrates two seafloor observatories 900a and 900b tethered to the ocean bed 810 and connected by cable 812 to each other and land based units. A UUV 802 swims from a location near a seafloor observatory 900a towards a location near seafloor observatory 900b. The seafloor observatories 900a and 900b and the UUV 802 are equipped with optical modems 504 In particular, seafloor observatories 900a and 900b are located at distances greater than the allowable range of about 100 m. Each seafloor observatory 900a and 900b are similar to seafloor observatory 804 of FIG. 8. The seafloor observatories 900a and 900b serve as stationary nodes that measure and record data from different regions of the seafloor. However, due to high expense of setting up seafloor observatories over a large area on the ocean bed 810 may be difficult. Seafloor observatories 900a and 900b are examples of seafloor observatories set up at distances larger than the sum of the ranges allowed by each of the observatories 900a and 900b. The seafloor observatories 900a and 900b may be able to communicate with each other through cable 810. The seafloor observatories 900a and 900b may be equipped to communicate with a UUV 802.

UUV 802 may communicate with seafloor observatory 900a through optical modems 504. As the UUV 802 swims in the ocean away from seafloor observatory 900a, it begins to near the edge of the allowed range of optical communication between itself and seafloor observatory 900a. The UUV 802 may begin to receive communication from seafloor observatory 900b. As the UUV 802 moves away from seafloor observatory 900a, it begins to near seafloor observatory 900b. In one embodiment, when the UUV 802 is somewhere in between seafloor observatory 900a and 900b, it may be able to communicate with both seafloor observatories 900a and 900b. In another embodiment, the UUV 802 may be beyond the range of either one of the seafloor observatories 900a or 900b and would therefore temporarily halt communications. As the UUV 802 gets closer to seafloor observatory 900b, it communicates more with seafloor observatory 900b and less with seafloor observatory 900a. Such an operation in which as the UUV 802 is able to communicate while traversing from one seafloor observatory to another expands the reach of the UUV 802 and allows previously unexplored regions of the ocean to be explored and recorded. With an increased range of the UUV 802, the optical modems (in particular, the source and diffuser combination) may be configured to help reduce power consumption and improve efficiency of transmission.

Figure 10:
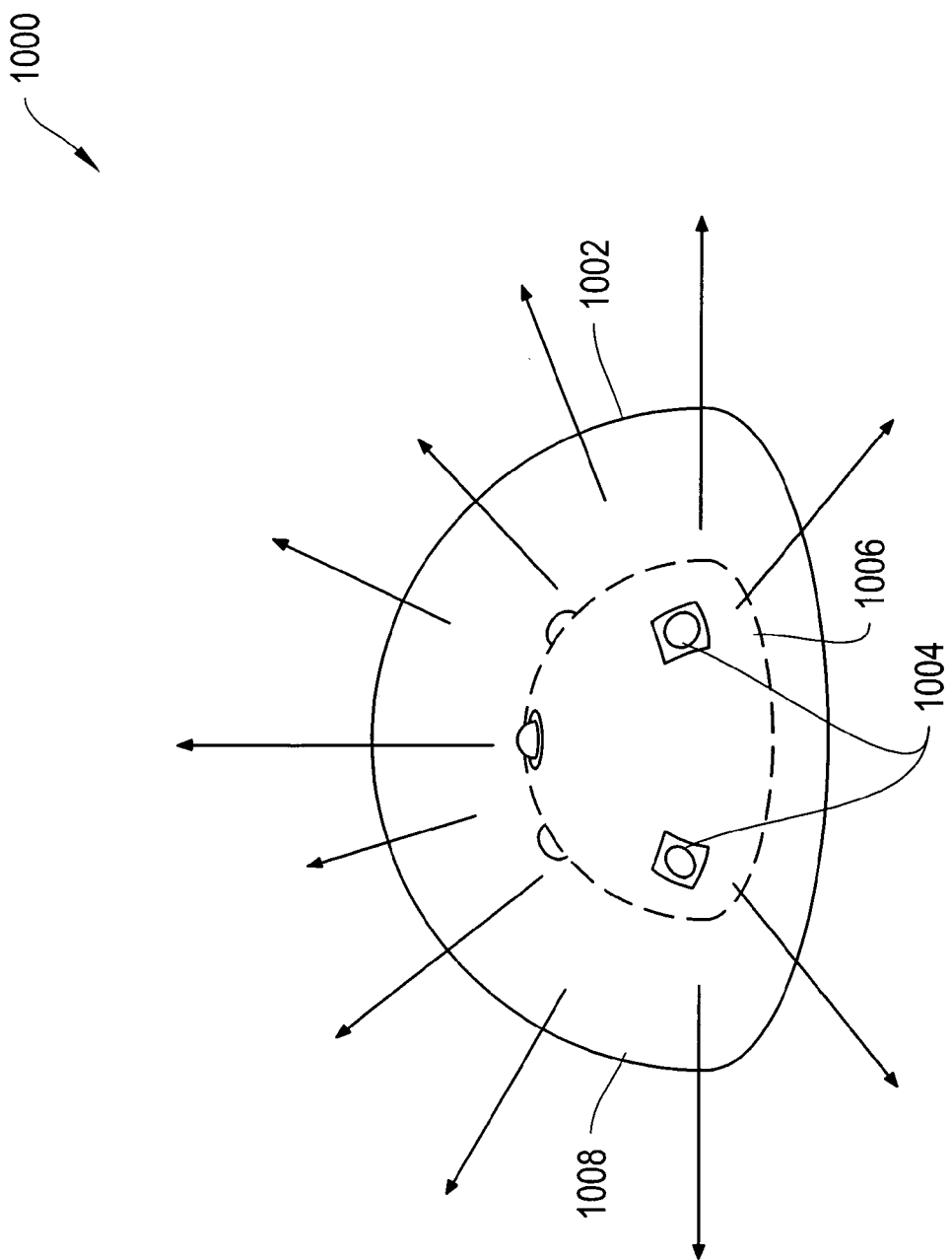
FIG. 10 depicts a transmitter including a plurality of sources and a diffuser according to one illustrative embodiment of the invention.

FIG. 10 depicts a transmitter configuration 1000 having a plurality of sources 1004 disposed within a diffuser 1002. In particular, the diffuser 1002 is of hemispherical shape having an inner curved surface 1006 and an outer curved surface 1008. The sources 1004 are disposed in the hemispherical diffuser 1002 such that they are protruding from the inner curved surface 1006 towards the outer curved surface 1008. In one embodiment, the source 1004 includes light emitting diodes and the diffuser 1002 includes a lightly scattered TiO$_2$/Silicone dome. The diffuser 1002 may also be formed similar to diffuser 310 of FIG. 3. The sources 1004 may include sources similar to oscillator 308 of FIG. 3. Each of the sources 1004 may be individually controllable such that one or more sources 1004 may be used to emit electromagnetic radiation. In certain implementations, the emitted electromagnetic radiation may be directed along one or more directions based at least in part on the operation of one or more sources 1004.

Power consumption may be controlled by the operating a specific number of sources 1004 as required.

Those skilled in the art will know or be able to ascertain using no more than routine experimentation, many equivalents to the embodiments and practices described herein. Accordingly, it will be understood that the invention is not to be limited to the embodiments disclosed herein, but is to be understood from the following claims, which are to be interpreted as broadly as allowed under the law.

What is claimed is:

1. An underwater communication system, comprising:
    a transmitter having a source capable of emitting electromagnetic radiation, and a diffuser having a substantially hemispherical surface, for transmitting the electromagnetic radiation at a rate of at least 1 Mbps along a plurality of radii defined by the surface for diffusing the electromagnetic radiation and disposed in a position surrounding a portion of the source for diffusing the electromagnetic radiation in a plurality of directions, and
    a receiver having a substantially hemispherical surface for receiving the electromagnetic radiation along a plurality of radii defined by the surface and being capable of detecting electromagnetic radiation passing at least 20 m through a high light scattering medium, such that the electromagnetic radiation can be received in substantially any direction;
    wherein, the transmitter and receiver are physically separated from each other, and
    wherein, the electromagnetic radiation includes electromagnetic waves of wavelength in the optical spectrum between 300 nm and 800 nm.

2. The system of claim 1, wherein the transmitter includes a plurality of sources.

3. The system of claim 2, wherein each of the plurality of sources are individually controllable.

4. The system of claim 1, wherein the transmitter includes an electronic circuit to drive the source.

5. The system of claim 4, wherein the electronic circuit includes at least one of an emitter coupled logic design, a cascade configured design, and a totem pole-type design.

6. The system of claim 4, wherein the electronic circuit includes at least one of a field effect transistor, and a bipolar device.

7. The system of claim 1, wherein the transmitter comprises an etalon to modulate the electromagnetic radiation from the source.

8. The system of claim 1, wherein the receiver comprises a diffuser capable of diffusing the electromagnetic radiation and disposed in a position surrounding a portion of the detector.

9. The system of claim 1, wherein the receiver includes an electronic circuit to prevent the saturation of the detector.

10. The system of claim 9, wherein the electronic circuit includes an automatic gain control circuit.

11. The system of claim 1, wherein the diffuser is formed from at least one of a discrete reflective element, and a discrete refractive element.

12. The system of claim 1, wherein the diffuser is integrally formed with the detector.

13. The system of claim 1, wherein the diffuser is integrally formed with the source.

14. The system of claim 1, wherein the diffuser is disposed on top of the source.

15. The system of claim 1, wherein the diffuser is capable of diffusing the electromagnetic radiation in a plurality of directions along a radius of a hemispherical region.

16. The system of claim 1, wherein the diffuser is formed from at least one of silicone and TiO2.

17. The system of claim 1, wherein the source includes at least one of a light emitting diode, a laser diode, and a photodiode.

18. The system of claim 1, wherein the source is embedded in the diffuser.

19. The system of claim 1, wherein the detector includes a photomultiplier tube.

20. The system of claim 19, wherein the photomultiplier tube includes a large-aperture, hemispherical photomultiplier tube.

21. An underwater communication system, comprising:
    two or more nodes that can transmit and receive electromagnetic radiation, each node including:
        a transmitter having a source capable of emitting electromagnetic radiation, and a diffuser having a substantially hemispherical surface for transmitting the electromagnetic radiation at a rate of at least 1 Mbps along a plurality of radii defined by the surface for diffusing the electromagnetic radiation and disposed in a position surrounding a portion of the source for diffusing the electromagnetic radiation in a plurality of directions, and
        a receiver having a substantially hemispherical surface for receiving the electromagnetic radiation along a plurality of radii defined by the surface and being capable of detecting electromagnetic radiation passing at least 20 m through a high light scattering medium, such that the electromagnetic radiation can be received in substantially any direction;
    wherein, the two or more nodes are physically separated from each other, and
    wherein, the electromagnetic radiation includes electromagnetic waves of wavelength in the optical spectrum between 300 nm and 800 nm.

22. The system of claim 21, wherein the power of transmission of the electromagnetic radiation is kept substantially constant over time.

23. The system of claim 21, wherein each of the two or more nodes transmit and receive the electromagnetic radiation at a rate of approximately 1 Mbps or higher.

24. The system of claim 21, wherein the two or more nodes are separated from each other by a distance of approximately 100 m or higher.

25. A system of claim 21, wherein at least one of the two or more nodes includes a mobile unit.

26. A system of claim 21, wherein at least one of the two or more nodes includes a stationary unit.

27. A method of manufacturing an optical modem for an underwater optical communication system, comprising the steps of
    providing at least one source of optical radiation of the type for transmitting at least 1 Mbps,
    disposing the at least one source within a diffuser having a substantially hemispherical surface such that the electromagnetic radiation emitted from the source is diffused in a plurality of different directions along a plurality of radii defined by the surface,
    providing at least one detector having a substantially hemispherical surface for receiving the electromagnetic radiation along a plurality of radii defined by the surface and being capable of detecting electromagnetic radiation passing at least 20 m through a high light scattering medium and thereby configured to receive and detect optical radiation from a plurality of different direction, and
enclosing a portion of at least one of the source, the diffuser and the detector in a water impermeable enclosure such that the optical modem may transmit and receive optical radiation underwater.

28. An underwater communication system according to claim 1, wherein,
   at least one of the transmitter and the receiver includes a water impermeable enclosure for disposition underwater.

29. An underwater communication system according to claim 21, wherein
   at least one of the transmitter and receiver is positioned underwater and the other is positioned above water.

30. An underwater communication system according to claim 21, wherein
   at least one of the two or more nodes are carried on a submarine, an unmanned underwater vehicle, a driver, an unmanned air vehicle or a buoy.

* * * * *

UNITED STATES PATENT AND TRADEMARK OFFICE
CERTIFICATE OF CORRECTION

| | | |
|---|---|---|
| PATENT NO. | : 7,953,326 B2 | |
| APPLICATION NO. | : 11/348726 | |
| DATED | : May 31, 2011 | |
| INVENTOR(S) | : Norman E. Farr et al. | |

It is certified that error appears in the above-identified patent and that said Letters Patent is hereby corrected as shown below:

In The Specification

In Column 1, Line 4 before "Background of the Invention" the following should be inserted:

--STATEMENT OF RIGHTS TO INVENTIONS MADE UNDER FEDERALLY SPONSORED RESEARCH
This invention was made with Government support under OCE0428552 awarded by the National Science Foundation. The Government has certain rights in this invention.--

Signed and Sealed this
Tenth Day of May, 2016

Michelle K. Lee
*Director of the United States Patent and Trademark Office*